Feb. 6, 1923.
H. F. SPENGLER.
AUTOMATIC PHONOGRAPH.
FILED AUG. 18, 1919.
1,444,089
13 SHEETS-SHEET 11
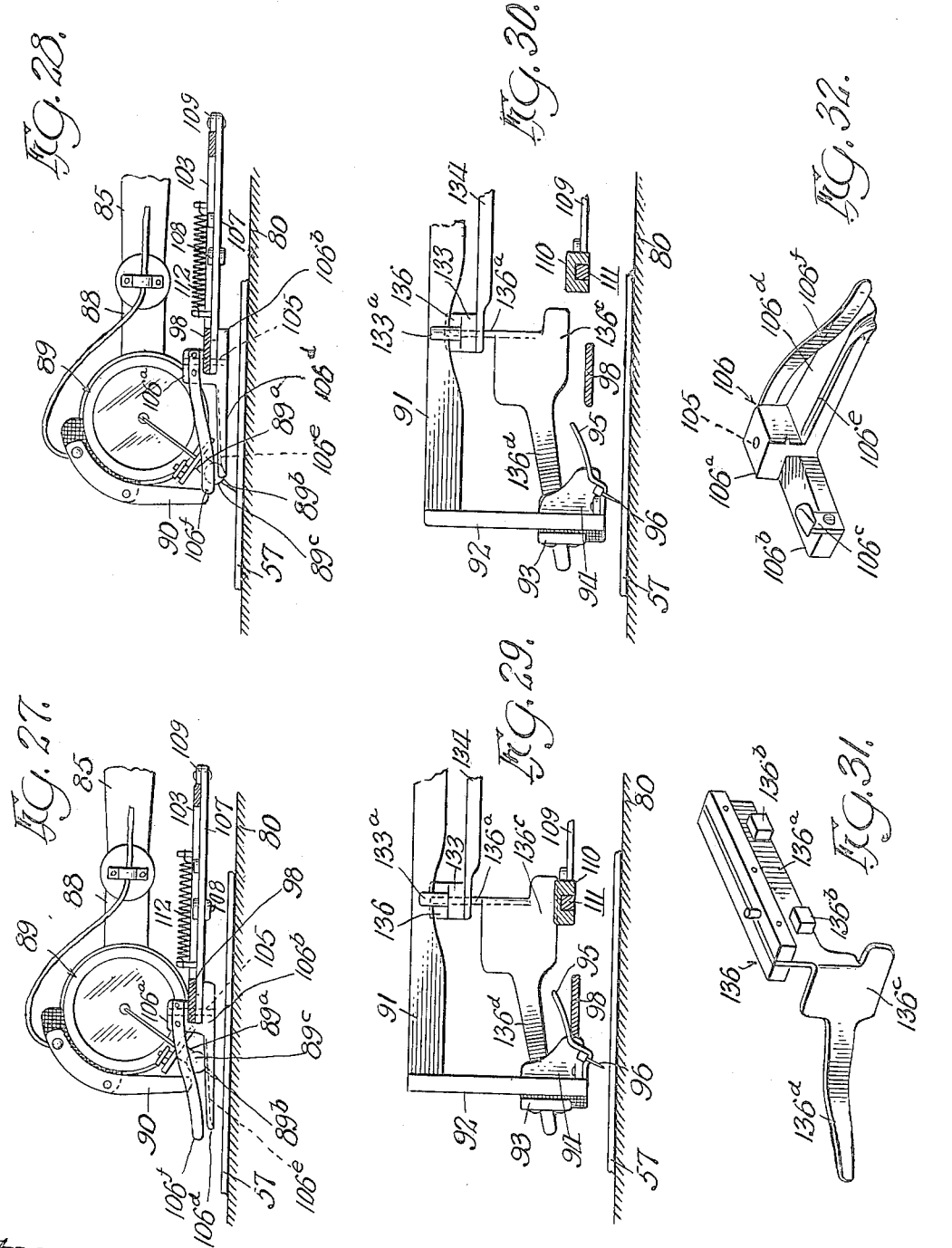

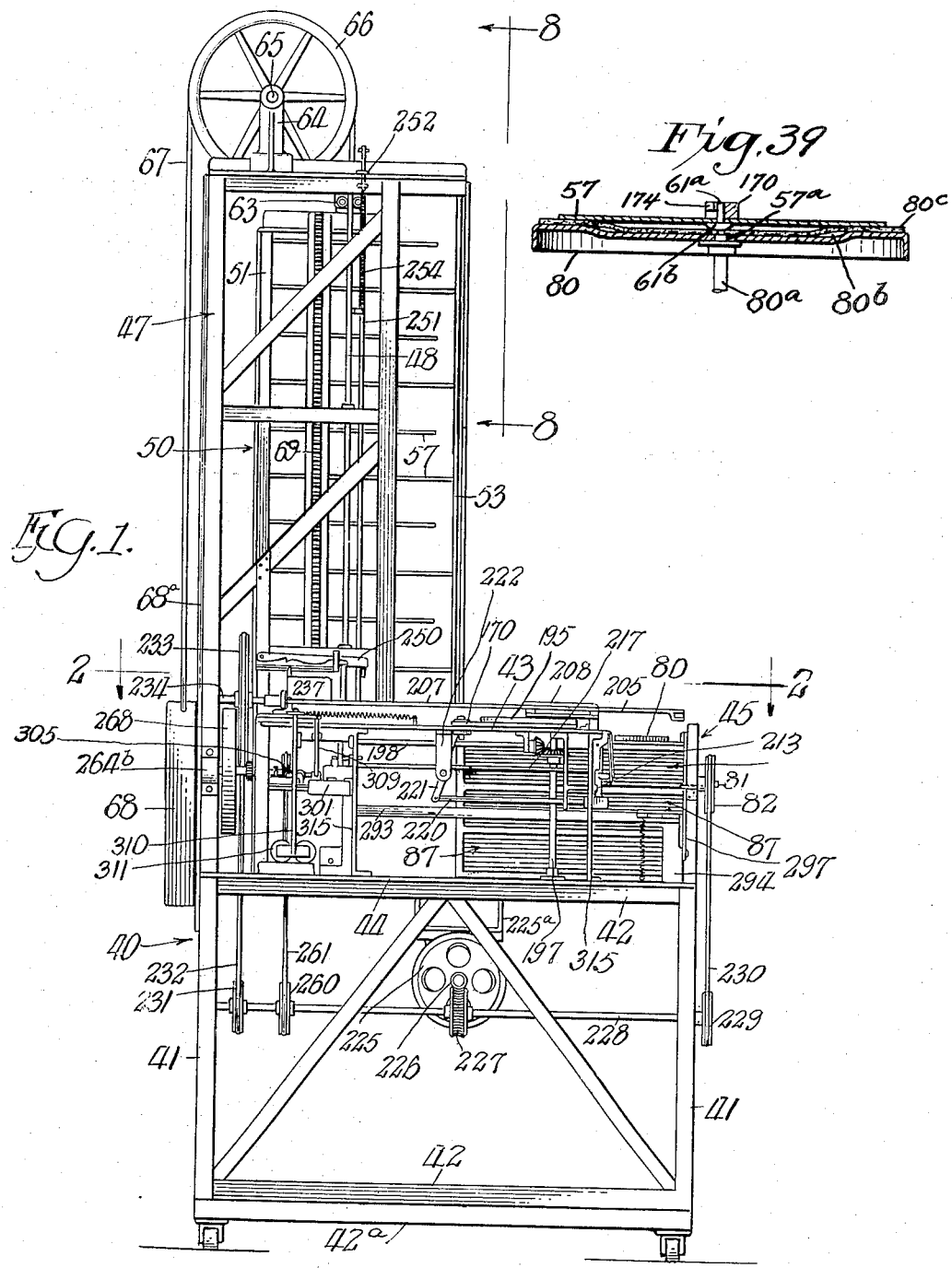

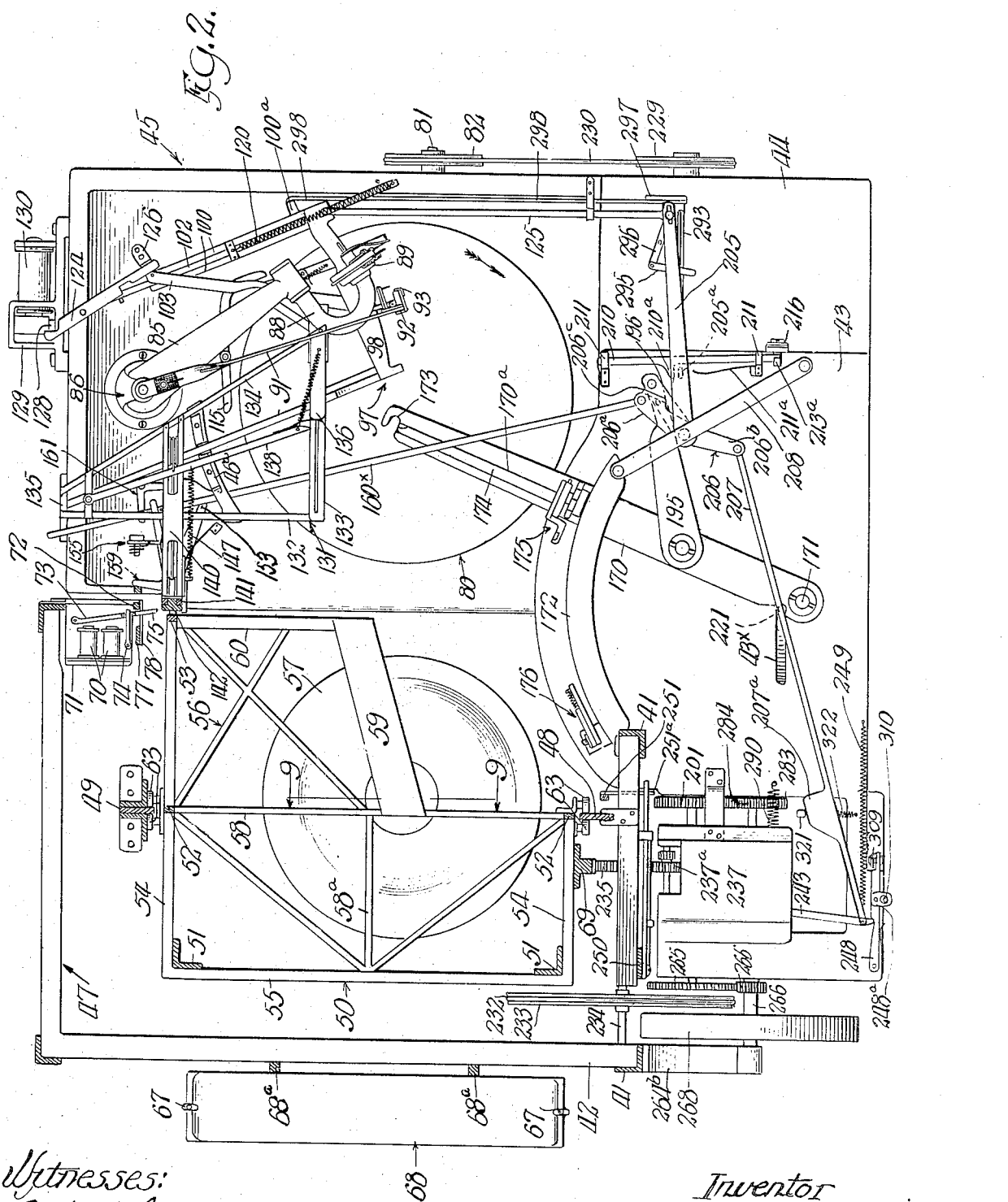

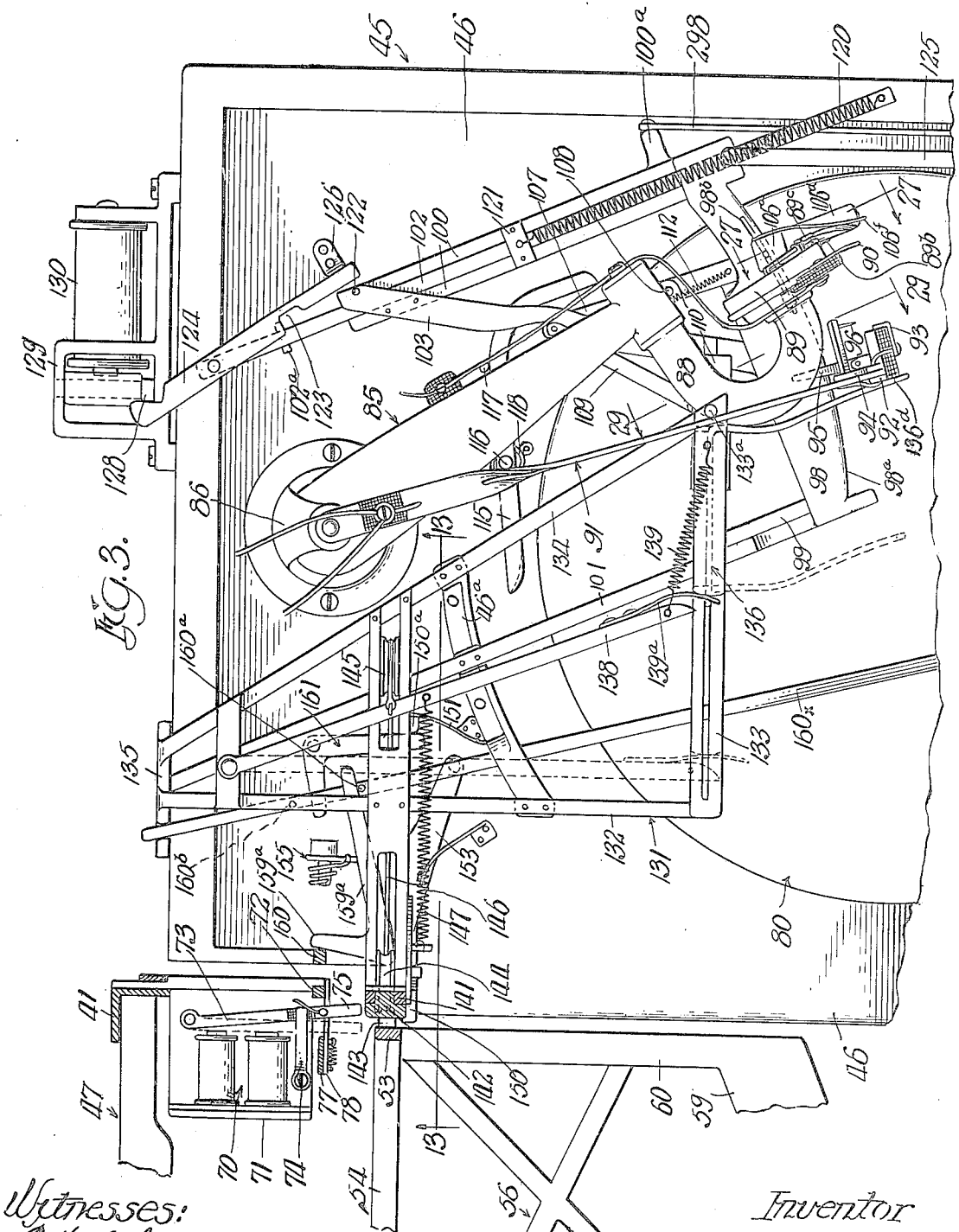

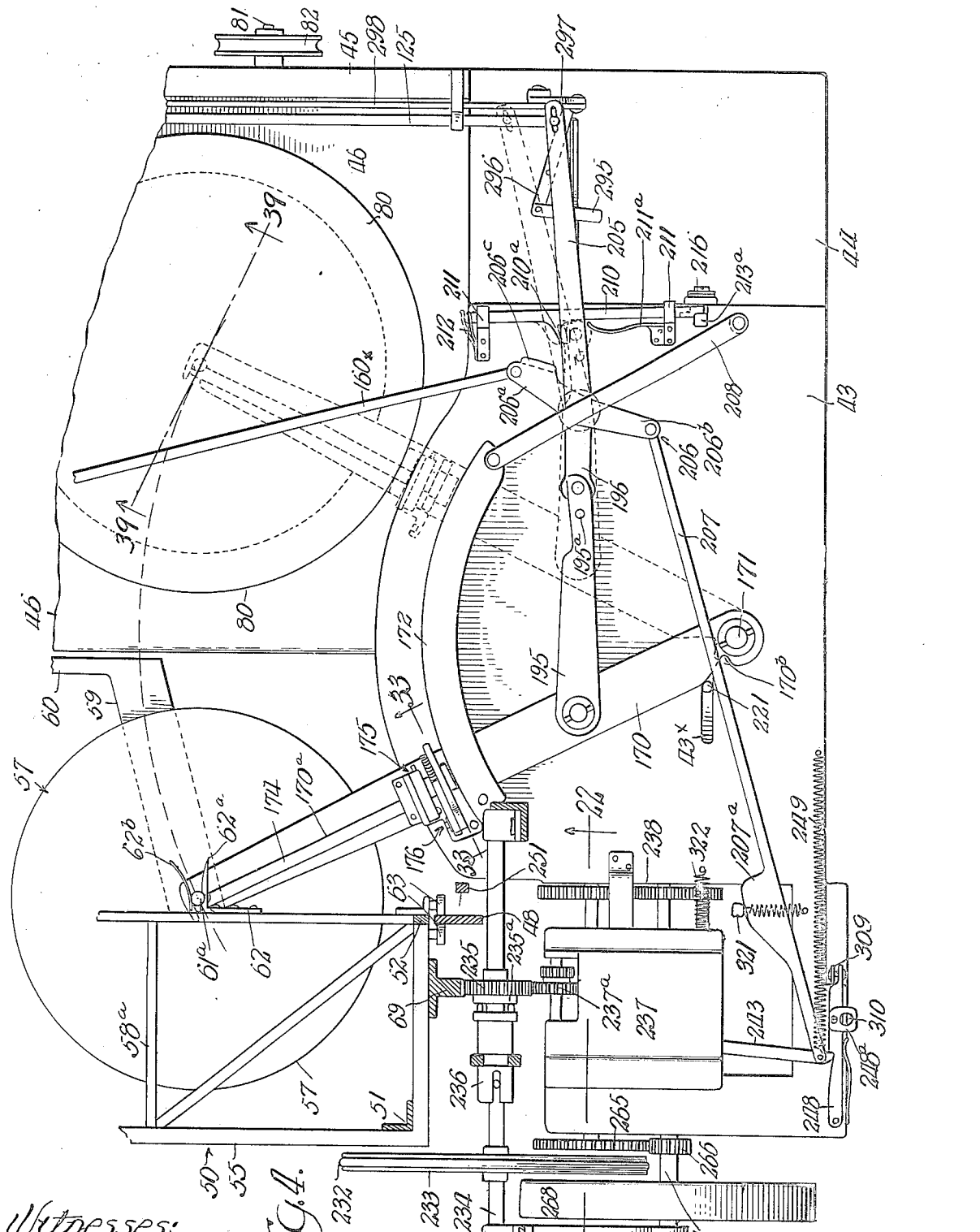

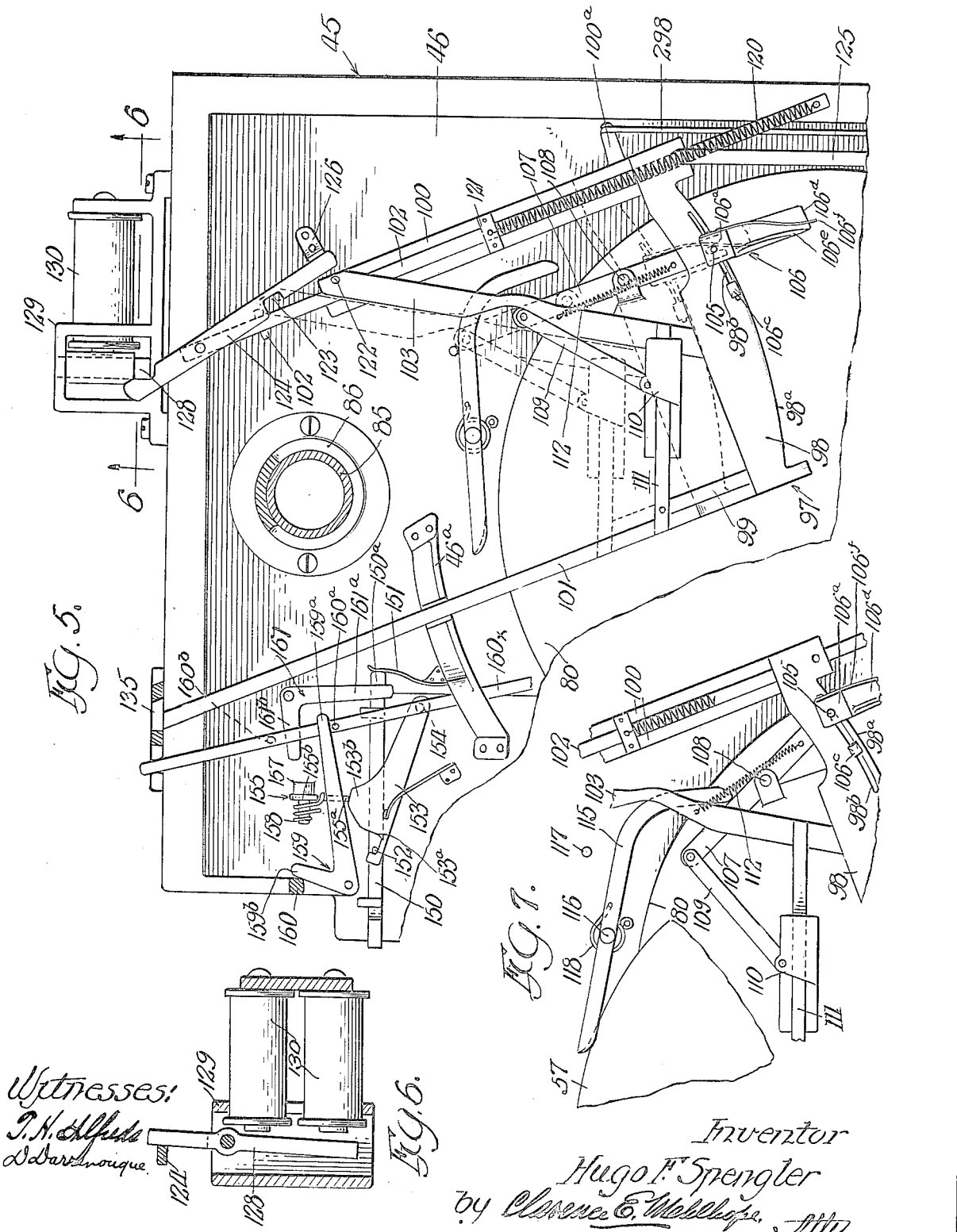

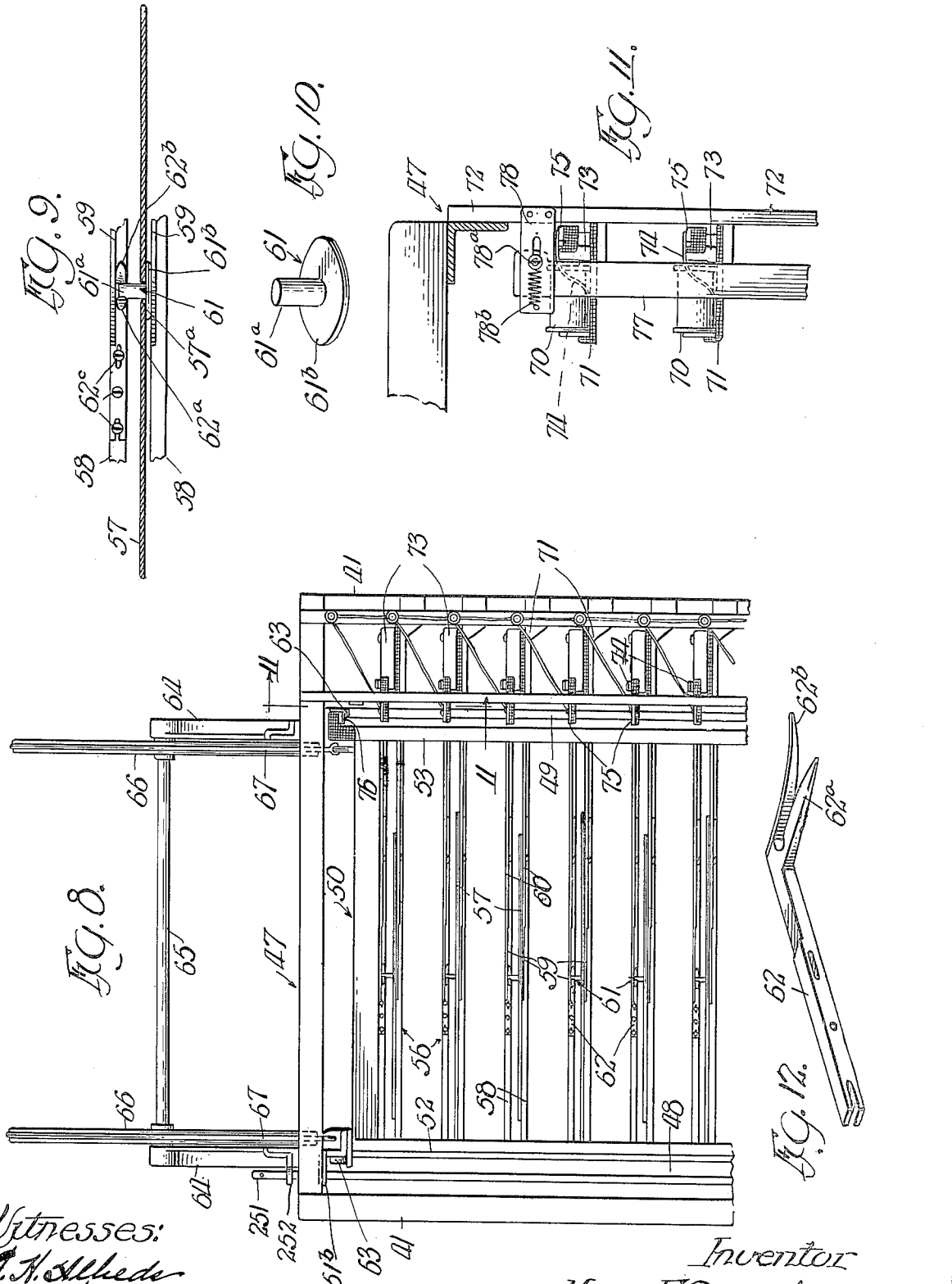

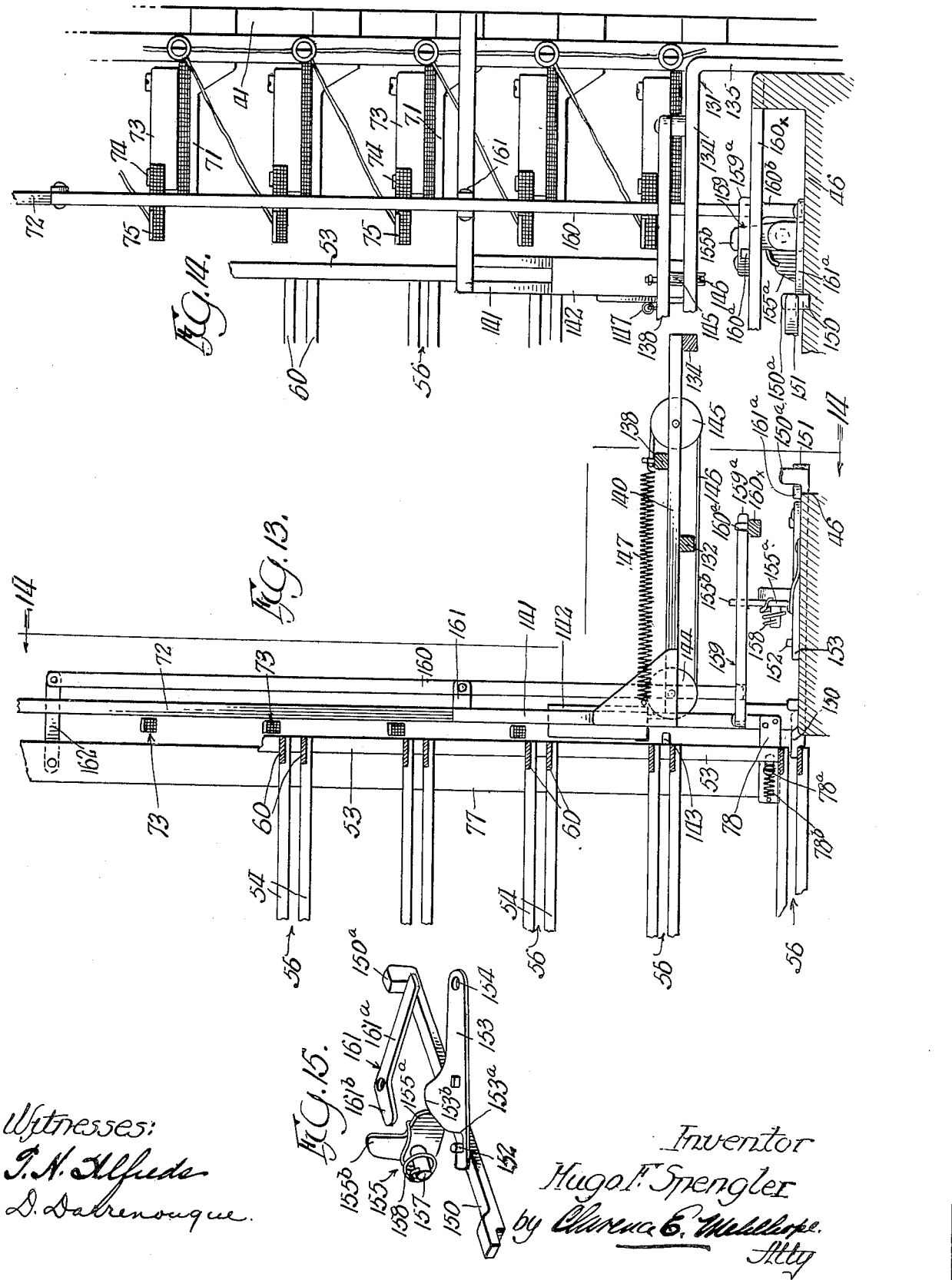

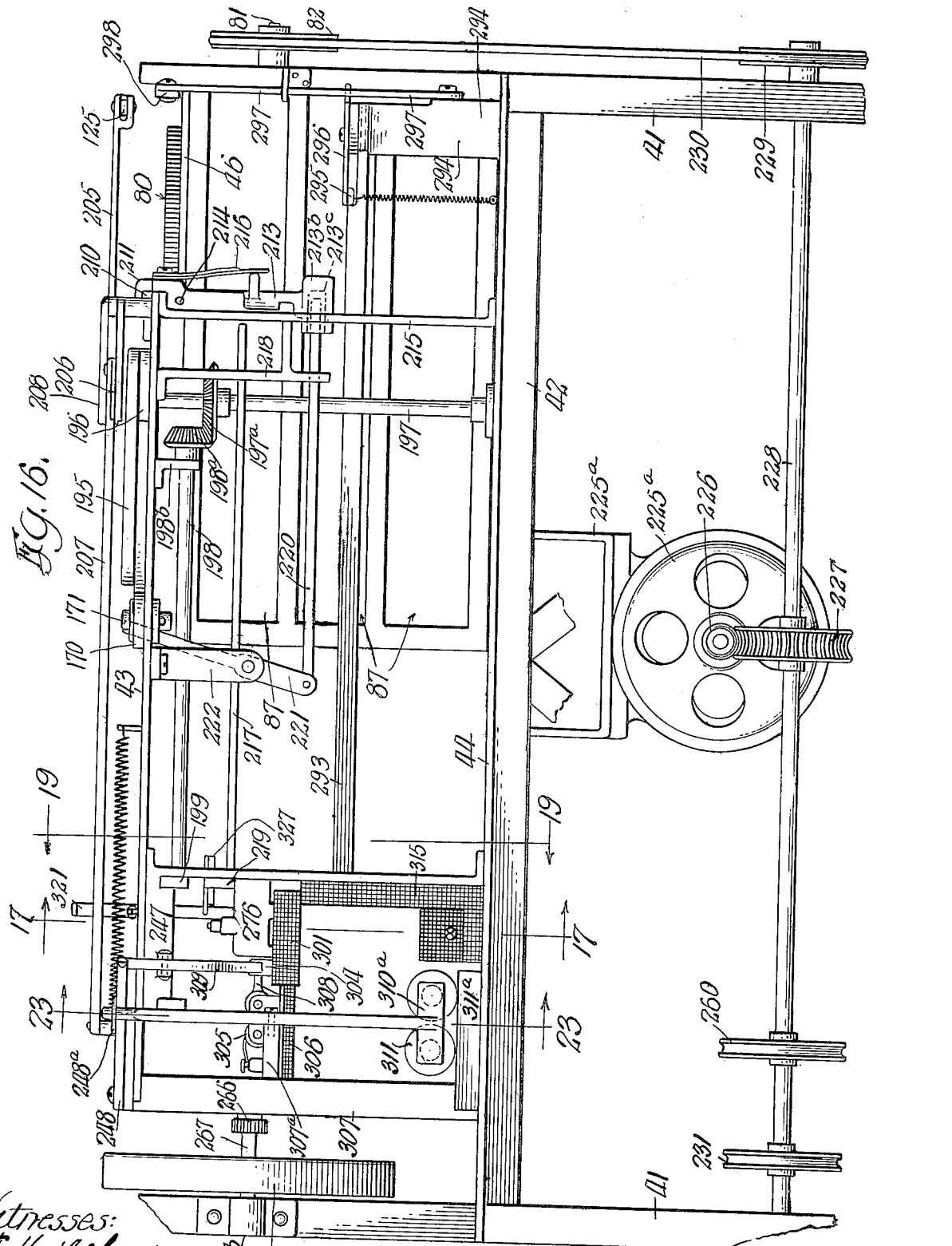

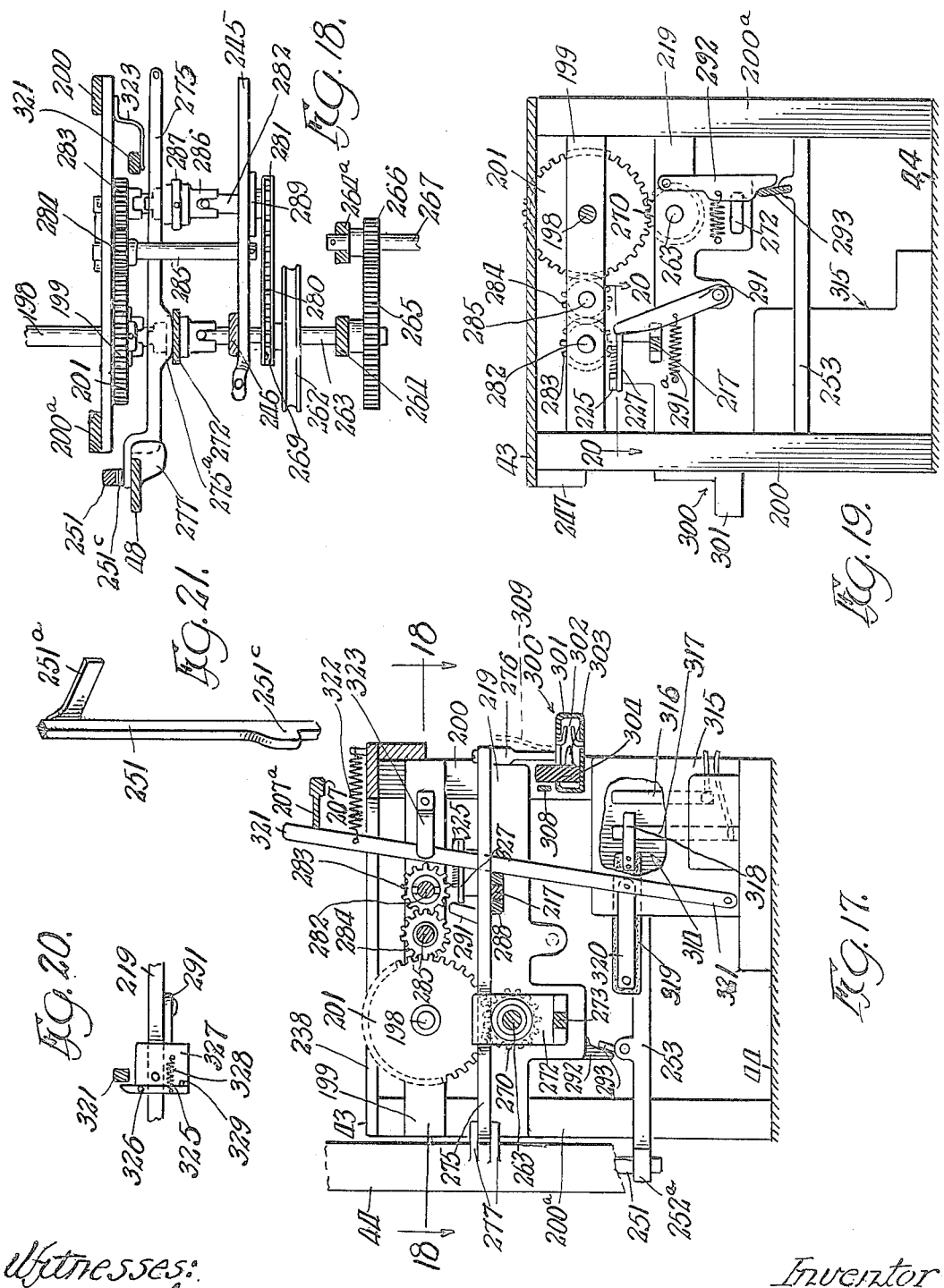

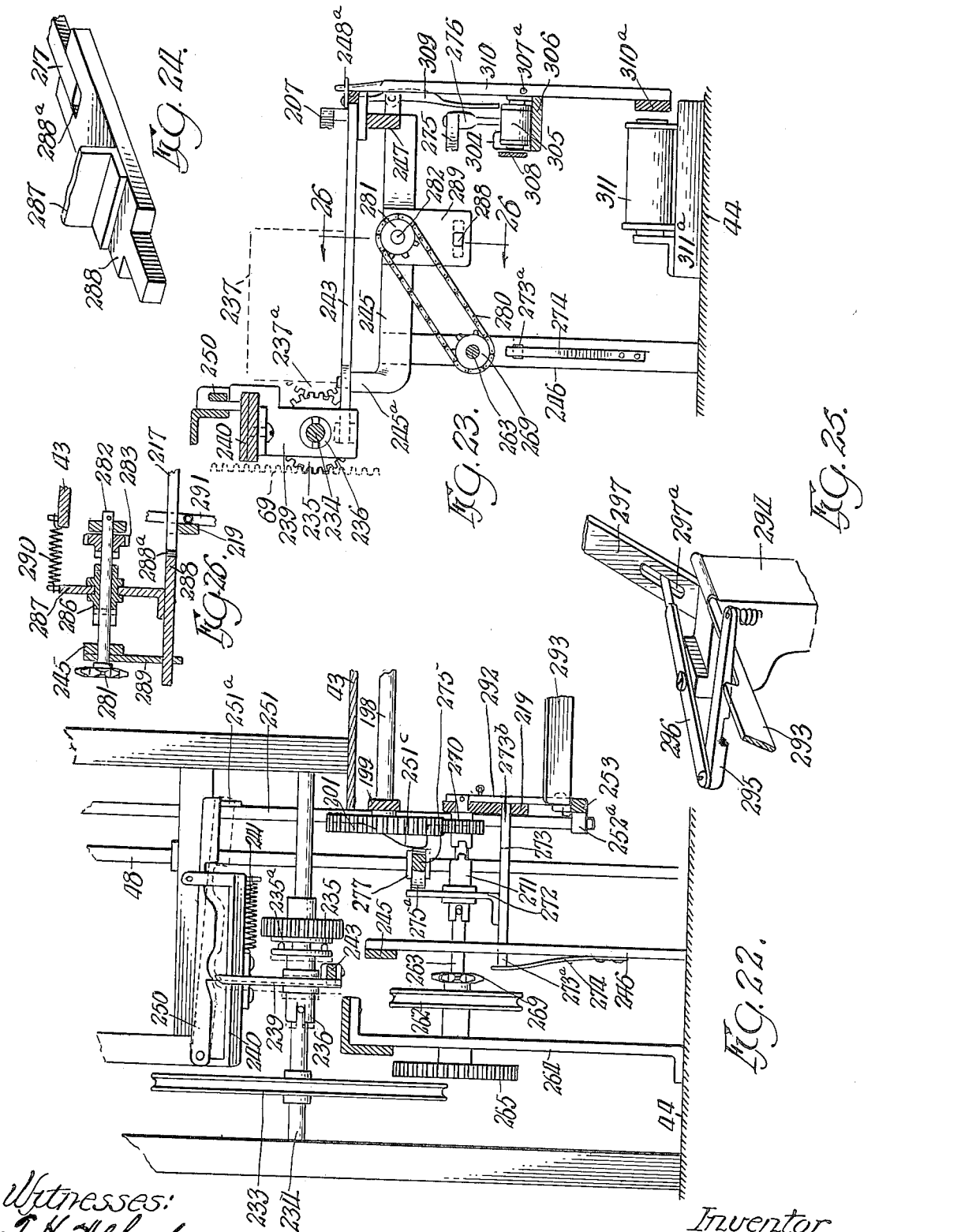

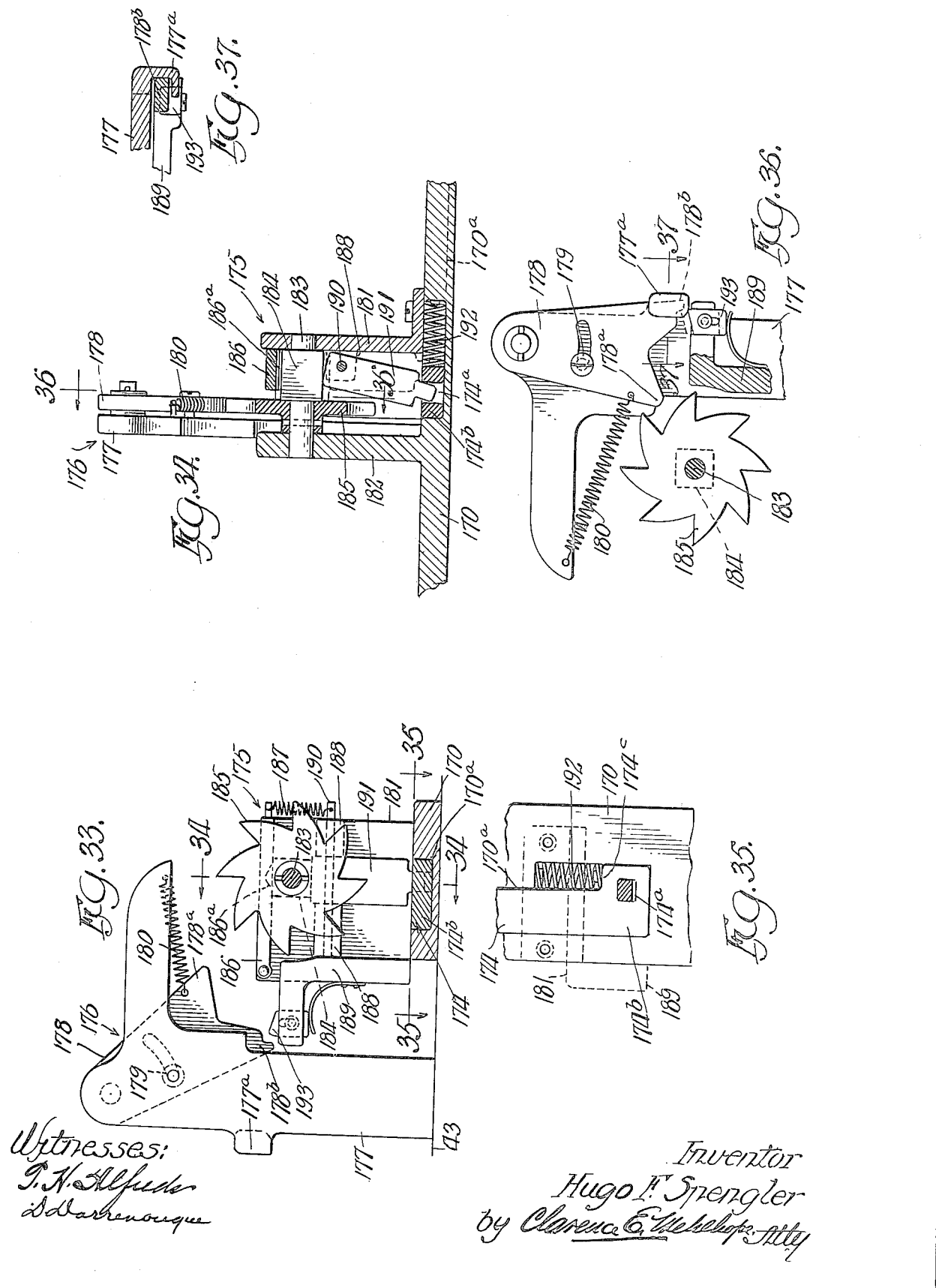

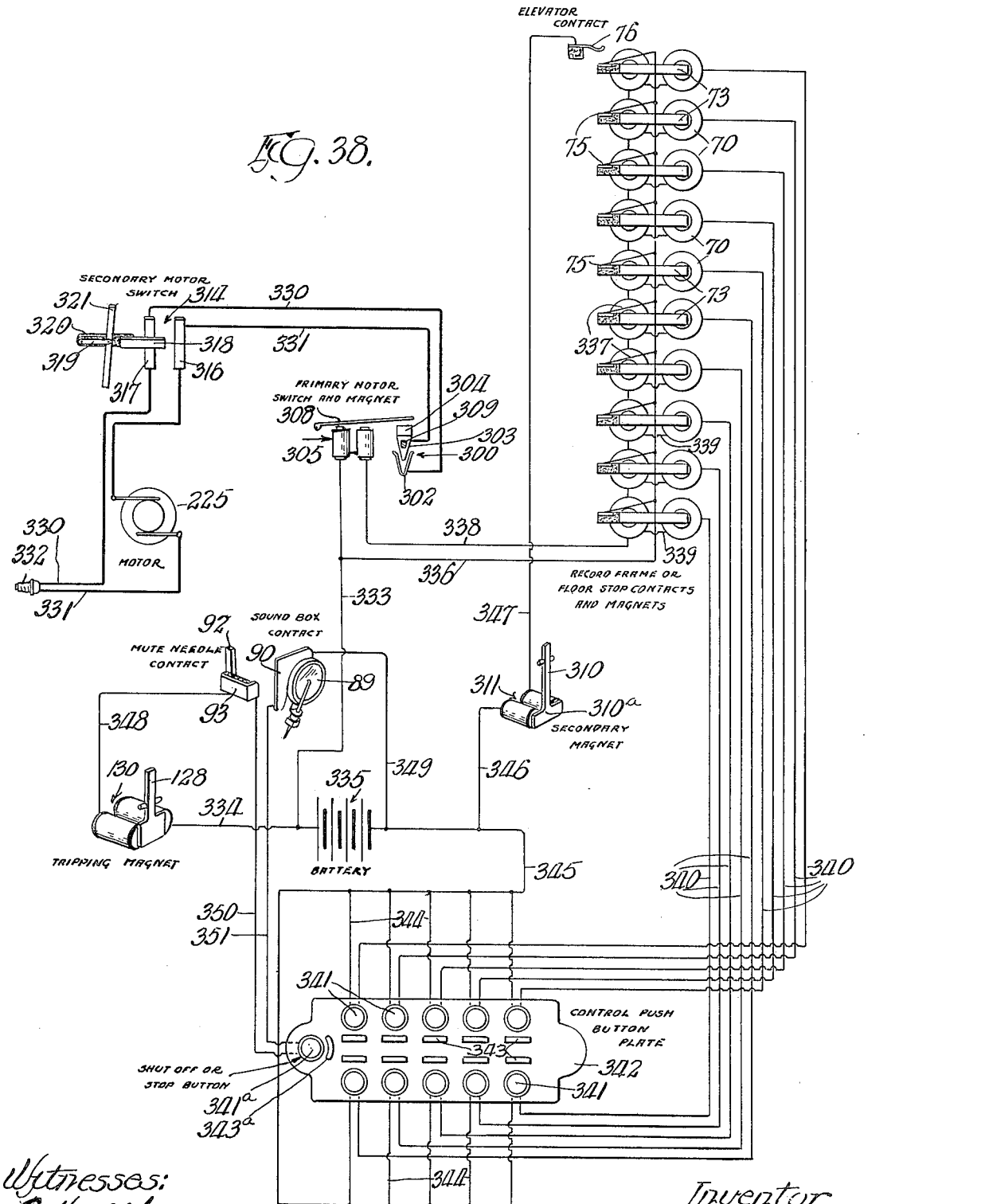

Patented Feb. 6, 1923.

1,444,089

UNITED STATES PATENT OFFICE.

HUGO F. SPENGLER, OF CHICAGO, ILLINOIS.

AUTOMATIC PHONOGRAPH.

Application filed August 18, 1919. Serial No. 318,077.

*To all whom it may concern:*

Be it known that I, HUGO F. SPENGLER, a citizen of the Republic of Germany, and a resident of Chicago, county of Cook, and State of Illinois, have invented certain new and useful Improvements in Automatic Phonographs; and I do hereby declare that the following is a full, clear, and exact description thereof, reference being had to the accompanying drawings, and to the letters of reference marked thereon, which form a part of this application.

This invention relates to improvements in automatic phonographs and consists of the matters hereinafter described and more particularly pointed out in the appended claims.

One of the objects of the invention is to provide a phonograph which is automatic in its operation, in every sense of the word, in that it is only necessary to touch a selective button, whereupon the corresponding disc record is removed from a vertically movable magazine, placed upon a rotating turn table, after which the reproducing stylus is caused to engage the record for the purpose of playing the same. After the record has been played, the stylus is lifted out of playing engagement with the same and the record is removed from the turn table and replaced in its proper place in the magazine. Thereafter the turn table is stopped and the tone arm reset so that all parts are ready to operate in order to play either another record, or the same record over again, when it is desired.

This object as well as other objects and advantages of my improved automatic phonograph, will be pointed out more particularly as I proceed with my specification.

In the drawings:

Fig. 1 represents a view in side elevation of the framework and mechanism of my improved automatic phonograph, the enclosing cabinet not being shown for the sake of clearness.

Fig. 2 represents, on an enlarged scale, a horizontal plan, sectional view of the same, with the parts in their normal at rest positions, the plane of the section being indicated by the line 2—2 of Fig. 1.

Fig. 3 represents, on a further enlarged scale, a fragmentary plan view of that part of the mechanism shown in the upper right hand corner of Fig. 2, and more particularly illustrates the tone arm and the parts associated therewith.

Fig. 4 represents a fragmentary plan view of that part of the mechanism shown at the bottom of Fig. 2 and illustrates the manner in which a disc record is removed from the magazine, and is brought into a playing position with reference to the turn table and is then returned to the magazine.

Fig. 5 represents a fragmentary plan view similar to that shown in Fig. 3 with the tone arm and more closely associated parts removed therefrom, to further illustrate the mechanism for placing the sound box and stylus in playing position on a disc record and lifting it out of playing position therefrom.

Fig. 6 represents a detail vertical section through a magnetic tripping device, which will be more specifically referred to later, the plane of the section being indicated by the line 6—6 of Fig. 5.

Fig. 7 represents a fragmentary plan view of parts shown in Fig. 5, and illustrates more specifically the mechanism for automatically setting the sound box with reference to the starting groove of a larger (say a 12-inch) record, after the playing of a smaller (say, a 10-inch) record.

Figure 8 represents a front elevational view of the top part of the disc record magazine, as looked at in the direction of the arrows 8—8 of Fig. 1, and illustrates the arrangement of the record holding frames or floors of said magazine.

Fig. 9 represents a vertical, detail sectional view through a part of one of the record supporting frames of the magazine, the plane of the section being indicated by the line 9—9 of Fig. 2.

Fig. 10 represents a perspective view of a loose pin, one of which is associated with and forms the axis or pivot pin of each disc record.

Fig. 11 represents, on an enlarged scale, a vertical, detail sectional view through a part of the top end of the frame work of the automatic phonograph, associated with the magazine, the plane of the section being indicated by the line 11—11 of Fig. 8.

Fig. 12 represents a perspective view of a record pin-holding fork, there being one associated with each record holding frame of the magazine.

Fig. 13 represents a detail section through the mechanism which locks the magazine in position after it has been actuated to bring the particular selected record into a plane wherein it may be removed therefrom and placed upon the turn table and then returned to the magazine, the plane of the section being indicated by the line 13—13 of Fig. 3.

Fig. 14 represents a front view of the parts shown in Fig. 13, as looked at in the direction of the arrows 14, 14, on said Fig. 13.

Fig. 15 represents a perspective view of the locking bar for the elevator or magazine, and the actuating parts therefor.

Fig. 16 represents a view in side elevation on an enlarged scale, of parts shown in Fig. 1, and will be more particularly referred to later.

Fig. 17 represents a vertical section through parts of the improved automatic phonograph, shown in Fig. 16, the plane of the section being indicated by the line 17—17 of said Fig. 16.

Fig. 18 represents a horizontal sectional view through parts shown in Fig. 17, the plane of the section being indicated by the lines 18—18 of said Fig. 17.

Fig. 19 represents a vertical sectional view through parts shown in Fig. 16, the plane of the section being indicated by the line 19—19 of said Fig. 16.

Fig. 20 represents a horizontal sectional detail view of a tripping device embodied in my improved automatic phonograph, the plane of the section being indicated by the line 20—20 of Fig. 10.

Fig. 21 represents a perspective view of a part of a tripping bar embodied in my improved automatic phonograph and which will be more specifically referred to later.

Fig. 22 represents a vertical, detail sectional view through parts of the mechanism, the plane of the section being indicated by the line 22—22 of Fig. 4.

Fig. 23 represents another vertical, detail sectional view through parts of the mechanism shown in Fig. 16, the plane of the section being indicated by the line 23—23 of said Fig. 16.

Fig. 24 is a detail perspective view of parts of the mechanism which will be more specifically referred to later.

Fig. 25 is another detail perspective view of parts of the mechanism which will also be more specifically referred to later.

Fig. 26 represents a vertical detail section through parts shown in Fig. 23, the plane of the section being indicated by the line 26—26 of Fig. 23.

Fig. 27 represents a detail vertical sectional view through parts of the mechanism shown in Fig. 3, the plane of the section being indicated by the line 27—27 of said Fig. 3.

Fig. 28 represents a view similar to that shown in Fig. 27, but with the parts shown in changed relation.

Fig. 29 represents a detail, vertical sectional view through parts of the mechanism shown in Fig. 3, the plane of the section being indicated by the line 29—29 of said Fig. 3.

Fig. 30 represents a view similar to that shown in Fig. 29, but with the parts shown in changed relation.

Figs. 31 and 32, respectively, are detail perspective views of parts which will be more specifically referred to later.

Fig. 33 represents a vertical, detail sectional view through parts of the mechanism associated with the record transferring arm, the plane of the section being indicated by the line 33—33 of Fig. 4.

Fig. 34 represents a vertical detail sectional view through parts shown in Fig. 33, the plane of the section being indicated by the line 34—34 of said Fig. 33.

Fig. 35 represents a horizontal detail sectional view through parts shown in Fig. 33, the plane of said section being indicated by the line 35—35 of said Fig. 33.

Fig. 36 represents a vertical detail sectional view through parts shown in Fig. 34, the plane of the section being indicated by the line 36—36 of said Fig. 34.

Fig. 37 represents a horizontal detail sectional view through parts shown in Fig. 36, the plane of the section being indicated by the line 37—37 of said Fig. 36.

Fig. 38 represents a diagram of the electric circuits and associated parts, embodied in my improved automatic phonograph.

Figure 39 is a vertical detail section through the turn table and record thereon, taken on the line 39—39 of Figure 4.

Referring now in detail to that embodiment of the invention illustrated in the accompanying drawings: 40 indicates a suitable rectangular frame, which includes upright angle bars 41, connected together by horizontal angle bars 42, in a manner rigidly bracing the frame as a whole. Said frame also includes a base 42ª to which are secured casters, so that the phonograph as a whole may be moved about. Secured to said frame along its front face are vertically spaced, upper and lower platforms 43 and 44 respectively, and at the rear right hand side of the frame is a casing 45, which encloses a driving mechanism for the record turn table, the top wall 46 of said casing being arranged in a plane slightly below that of the upper platform, 43. At the rear left hand side of the frame, several of the upright angle bars 41 are extended above the platforms 43, 44, and are suitably connected together to provide a secondary frame 47. This secondary frame includes front and rear upright guide bars 48, 49 for vertically movable magazine or elevator 50.

The magazine 50 is made up of upright bars 51, 52 and 53, suitably connected together and braced by horizontal front and rear bars 54 and side bars 55, and a plurality of vertically spaced record frames 56, each adapted to hold a disc record 57 in a manner soon to appear. Each record frame comprises top and bottom bars 58 connecting the upright bars 52 together,—top and bottom bars 58ª connecting said bars 58 with the angle bars 55, and top and bottom, obliquely arranged plates 59 which are connected at one end to the bars 58 and at their other ends to bars 60 connected in turn to the upright 53.

The space between the top and bottom members of each record frame is adapted to receive one disc record 57 which normally rests and is held in proper position on the lower members of the record frame in a manner now to be described. Each disc record has the usual central hole 57ª (see Fig. 9) and through said hole from the bottom side of the record, is inserted the stem 61ª of a loose pin 61 (see Fig. 10), there being of course a loose pin 61 associated with each record. Said pin has a flange 61ᵇ engaging the bottom surface of the disc record and the stem is of such length as to extend a distance above the record when inserted through the hole therein. When the record is within its frame, the top end of the stem 61ª is removably engaged between the tines 62ª and 62ᵇ of a forked bar 62 (shown in perspective in Fig. 12), secured to the side of the top bar 58 adjacent the plate 59, by screws 62ᶜ, in a manner permitting an endwise movement of the bar 62 as well as an outward movement, so as to permit of an adjustment insuring the correct positioning of all the pins 61 of all the records in the magazine, with reference to a notch in an associated lever which transfers any selected record from the magazine to the turn table.

Fixed to the top and bottom ends of the front and rear members 54 of the magazine frame, are pairs of spaced guide rollers 63 which engage and roll against the side faces of the upright rails 48 and 49, so as to guide said frame in its vertical movement. To the top end of the secondary frame 4, are fixed bearing standards 64 for a horizontal shaft 65 to which is fixed two grooved wheels or pulleys 66. Cables 67 are trained over said pulleys, one end of said cables being attached to the top end of the magazine and to the other end being attached a counter weight 68. The counter weight, which is slightly heavier than the magazine, slides against upright rails 68ª fixed to the left hand side of the machine frame for that purpose. To the magazine frame 50 near the rail or guide 48, is fixed an upright rack bar 69 which is engaged by a gear, as will be presently described, to impart a downward movement to the magazine, the upward movement of the magazine being produced by the action of the counter weight 68.

Mounted on the secondary frame 47 near the upright bar 53 of the magazine, are a plurality of vertically spaced pairs of magnets 70, one pair associated with each record frame 56; (see Figs. 2, 3 and 8). Each pair of magnets is mounted on a shelf 71 that is attached to one of the angle bars 41 of the secondary frame, and another upright bar 72 also forming a part of said secondary frame. A contact arm 73 is pivoted on each shelf and is adapted to be attracted and moved by the associated magnets 70 when energized, to move said contact arm from the full line position to the dotted line position shown in Fig. 3. A leaf spring 74 fixed to each shelf prevents the too rapid movement of said arm 73 when the magnet is energized. Each arm carries a contact 75 which is insulated from the rest of the arm and which is adapted, when in said dotted line position, to extend into the path of a spring contact 76 (see Fig. 8) carried at the top end of the magazine frame and to be engaged by said contact when the magazine moves downwardly. A vertically arranged, universal bar 77 (see Figs. 3, 11 and 13) is mounted at its ends on top and bottom slotted plates 78, fixed to the bar 72, in such manner as to be actuated to reset any contact arm from said dotted line position back to the full line position after engagement by the contact 76 on the magazine frame. Preferably, a screw 78ª extends through each slotted arm and into the associated end of the bar 77, and a spring 78ᵇ fixed at one end to said screw and at the other end to the plate 78, holds said bar in the retracted position as shown.

80 indicates the turn table, which in this case is flush on its top surface, as it has no center pin usually provided for the center hole 57ª in the record 57. This turn table is mounted on an upright shaft 80ª (see Fig. 39) which projects through the top wall 46 of the casing 45. It is of the usual pressed or stamped sheet metal type, having a central depression 80ᵇ in its top surface and is provided with a felt cover 80ᶜ which is fixed to the margin of the turn table in the usual manner. When a record and its pin 61 has been removed from the magazine and has been placed upon the turn table, the flange 61ᵇ of the loose pin 61 depresses the felt near the center of the turn table as shown in said Figure 39, and the record rests at its margin upon the felt covered margin of the turn table and receives its rotation through this marginal engagement. Thus the flange 61ᵇ of the pin 61 in no way interferes with the proper drive or rotation of the record. This casing also contains the usual gearing for actuating said turn table, said gearing itself being driven from a horizontal shaft 81 which projects without one side of the casing 45, where it is provided with a driving pulley 82. This turn table rotates, when driven in the direction of the arrow shown in Fig. 2.

85 indicates the tone arm, one end of which is pivoted in a bracket 86 on the casing top wall 46, so as to swing in a horizontal plane about the vertical axis of said bracket. This end of the tone arm is connected with the usual sound amplifying passageways 87 in the casing 45, which open through the front thereof, as shown in Figs. 1 and 16. To the other end of the tone arm 85 is pivotally connected a goose neck 88 which carries a reproducer or sound box 89. Said reproducer is of the usual form and includes a holder 89$^a$ (see Fig. 27) for a stylus 89$^b$, which is clamped in said holder by a thumb screw 89$^c$. Said sound box is also provided with an insulated spring contact finger 90 for a use presently to appear.

Associated with the tone arm is a mute arm 91 which is pivoted in the bracket 86 coincident with the tone arm. The mute arm consists of a flat bar which is twisted at its middle so that its free outer end is arranged in an edgewise manner, and to said outer end is fixed a depending post 92. Near the bottom end of said post is an insulated contact member 93 adapted to be engaged by the spring contact 90 on the reproducer, as the said reproducer reaches the end of the active sound grooves in the record, during the playing of the same. To the bottom end of the post 92 is secured a bracket 94 which carries a curved arm 95 and a mute needle 96, which, during the playing of a record, is engaged in the sound groove but does not reproduce any sound waves.

Both the reproducer 89 and the mute needle 96 are normally held in a position above and out of engagement with the record, by a movable frame indicated as a whole by the numeral 97, in Fig. 5. This frame includes a horizontal flat plate 98, the front edge 98$^a$ of which is made arcuate, about the center of the bracket 86 as an axis, and rearwardly extending oblique side members 99 and 100, respectively. Said side members have sliding bearing upon parallel, obliquely arranged supporting rails 101 and 102, respectively. The rail 101 is fixed at one end to the rear wall of the casing 45, and projects into the vicinity of the center of the turn table and is supported intermediate its ends upon an arcuate bracket 46$^a$ fixed to the top wall 46 of the casing 45. The other rail 102 is fixed at its ends in the rear and side walls of the casing 45. The two bars comprising the side member 100 of the frame 97, embrace the sides of the rail 102, and a bridge piece 103 connects the rear end of said side members with the plate 98 near its middle.

In the plate 98 near its arcuate, rounded edge 98$^a$, is a slot 98$^b$, and through this slot extends a pin 105 which operatively holds a block 106 (shown in perspective in Fig. 32) in position upon said plate. This block has a top 106$^a$ which engages the top surface of the plate, and a lateral extension 106$^b$ which engages the bottom surface of said plate. The extension 106$^b$ has a lug 106$^c$, which also extends through said slot, so as to guide the block in its movement on said plate. The lug 106$^c$ has a head which projects above the top surface of the plate, so that the said head and top 106$^a$ provide spaced shoulders between which the sound box 89 normally engages, when the sound box is in an elevated position above the turn table. The block 106 also includes a forward extension 106$^d$ which has a groove 106$^e$ that widens out and is inclined downwardly, as it approaches the end of said extension. This groove is adapted to receive the thumb nut 89$^c$ of the stylus holder 89$^a$ and guide the stylus to its proper playing position with reference to the starting of the sound groove on the record. A leaf spring 106$^f$ on the head 106$^a$ engages the said thumb nut as the end of the groove 106$^e$ is approached by said nut, in order to insure a positive release of the nut from the groove. Said block 106 normally assumes the position shown in Fig. 5, wherein the lug 106$^c$ is at the left hand end of the slot 98$^b$.

A lever 107 pivoted at 108 to the bridge piece 103, has a forked end which engages the pin 105 beneath the plate 98, the other end of the lever being connected by a link 109 to a block 110 slidably mounted on a short, horizontally disposed rail 111 fixed to the bridge piece 103 and member 99 respectively, of the frame 97. Said rail also has sliding bearing support on the member 101. A coiled spring 112 which is fixed to the bridge piece 103 and to the lever 107, assists to impart a swinging movement to the lever on both sides of the center of the pivot 108, as shown in Figs. 5 and 7 respectively. As shown in Fig. 5, the parts are in the position for setting a stylus with respect to the starting groove of a standard size disc record, say a 10-inch record, but if a 12-inch record is to be played, said record automatically sets or positions the sound box and stylus with respect to the starting point or groove of said 12-inch record. As the 12-inch record is transferred from the magazine to a playing position on the turn table, the edge of said record engages a lever 115 (as shown in Fig. 7), which is pivoted as at 116, on the casing top wall 46, the other end of said lever being bent to engage that end of the lever 107 connected to the link 109, and swing said lever so that its forked end will move the block 106 outwardly into the position shown in Fig. 7, where, when the 12-inch record is brought into playing position on the turn table, and the stylus will be correctly positioned with reference to the starting groove on said record. It will be noticed that the spring 112 has passed over the pivot 108 and has thus assisted the lever 115 to move said block into this position. When the block has been set, the other block 110 has been moved into a position wherein the other parts of the mechanism will engage it, after the record has been played, to reset the parts ready for playing a 10-inch record. The lever 115, after it has been engaged by the 12-inch record, is returned to its normal position against a top pin 117, rising from the top wall 46, by a spring 118.

The frame 97 is held in the normal, full line position shown in Fig. 5, by a contractile coiled spring 120 which is fixed at one end to the side wall of the casing 45 in the vicinity of the end of the rail 102, and is fixed at its other end to a plate 121 which in turn is attached to the members 100 of the frame 97, at their middle parts. An upright pin 122 is fixed to that end of the bridge piece connected to the members 100, and this pin is adapted to enter a notch 123 in a horizontal swinging latch 124, as shown in dotted lines in Fig. 5, so as to lock said frame in this position after it has been actuated by a rod 125, as will later appear. The latch 124 is pivoted on a pin which also attaches the rear end of the rail 102 to the rear wall of the casing 45 and an upright leaf spring 126 arising from the wall and engaging the inner end of the latch, holds said latch in the desired position. When the rod 125 moves the frame 97 rearwardly, the pin 122 will engage the latch and swing it about its pivot until said pin enters the notch 123. When the parts are thus engaged, the rear end of the members 100 will abut against a transverse pin 102ª on the rail 102. The outer end of the latch 124 projects beyond the rear wall of the casing into a position to be engaged by a lever 128, which is pivoted on a horizontal pin carried by a frame 129 mounted on the rear wall of the casing, which frame also supports a pair of electromagnets 130. The top end of the lever 128 normally engages the latch 124 while the bottom end of said lever hangs in a position (see Fig. 6) wherein it may be attracted by the magnets 130 when energized, so that the top end will actuate the latch to release the pin 122, after which the spring 120 will return the frame 97 to its normal position, as clearly shown in Fig. 5.

131 indicates, as a whole, a triangularly shaped, horizontally disposed frame, fixed with respect to the casing 45 in a plane above that of its top wall 46 and the frame 97. This frame 131 includes a bar 132 arranged parallel with the side wall of the casing, a second slotted bar 133 arranged parallel with and vertically above the short rail 111, associated with the frame 97, before referred to, and a third obliquely arranged bar 134, which extends from the right hand end of the bar 133 to a point adjacent the rear end of the bar 132. The bars 132 and 134 are fixed at their rear ends to the rear wall of the casing by an upright plate 135, and at their middle said bars rest upon and are fixed to the arcuate bracket 46ª before referred to.

Slidably mounted on the slotted bar 133, is a block 136 (see Figs. 3 and 31) which has a depending middle flange 136ª that extends through the slot in the bar 133, so as to guide said block in its movement. Lugs 136ᵇ on the sides of said flange, near its bottom edge, prevent any vertical displacement of said block. One end of said flange is bent into a right-angularly extending plate 136ᶜ, which includes a relatively long, slightly bent arm 136ᵈ. When the parts just described are in their normal at rest position, the middle part of the plate 136ᶜ engages the goose neck 88 and the bottom end of said plate engages the adjacent end of the block 110, which slides on the short rail 111, while the arm 136ᵈ engages the post 92 of the mute needle arm 91. On the right hand end of the slotted bar 133 is a pin 133ª (see Figs. 3 and 29) which limits the swinging movement of the mute needle arm towards the right hand side wall of the casing 45.

Pivoted at one end to a cross piece near the rear ends of the frame bars 132, 134, is a horizontally swinging lever 138, the opposite end of which extends into the vicinity of the left hand end of the block 136. This lever is yieldingly connected to the block by means of a coiled spring 139, a shock absorbing buffer extension in the form of a flat leaf spring 139ª being interposed between the adjacent ends of said arm and block.

Fixed to the top surfaces of the frame bars 132, 134, but below the lever 138, in the vertical plane of the upright 53 of the magazine frame, is a horizontally disposed extension 140 which terminates in an upright guide 141 in which a block 142 has vertical sliding bearing. This block is arranged in the vertical plane of a pin 143 (see Fig. 13) mounted on the upright 53 of the magazine, so as to be engaged by said pin in the upward movement of the magazine. The extension 140 carries near its ends, pulleys 144 and 145 and about the bottom of said pulley is passed a small flexible cable 146, one end of which is fixed to the bottom end of the sliding block 142, while the other end passes about the pulley 145 to be attached to the swinging arm 138. A coiled expansion spring 147 is attached at its ends to the lever 138, and an angle plate which braces the junction of the extension 140 and upright 141.

When the magazine 47 moves downwardly to bring the desired selected record into the plane of the turn table, the pin 143 will move away from engagement with the block 142 when the spring 147 will pull or swing the arm 138 and block 136 into the dotted line position shown in Fig. 3, where they will remain, thus withdrawing the plate 136$^c$ and arm 136$^d$ from engagement with the goose neck 88, and mute needle post 92, so that they may move in their intended manner. As the arm 138 thus swings into the dotted line position, it will, through the cable 146, pull the block 142 into its lowermost position in the guide 141, where it remains ready to be engaged by the pin 143 to reset the associated parts, after the record has been played and returned to the magazine, and said magazine is moving upward to its normal position.

When the magazine has been moved downwardly to bring the desired selected record into the plane of the turn table, so that it may be moved or transferred from the magazine into playing position with respect to the turn table, the magazine is locked in this position by an endwise sliding bolt lock 150, arranged in a groove in the top wall 46 of the casing, below the extension 140. This bolt lock which is shown in its normal locked position in Fig. 5, and in its locking position in Fig. 13, is moved into the locking position by a flat leaf spring 151 (see Fig. 5), but is held out of locking position by a pin 152 on said bolt which engages in a notch 153$^a$ of a spring pressed latch 153, that is pivoted to swing in a horizontal plane about a pivot 154 near the right hand end of said locking bolt. The latch 153 which engages the top face of the bolt 150, has an extension 153$^b$ which normally engages against the horizontal cam shaped arm 155$^a$ (see Figs. 5 and 15) of a bell crank lever 155. This bell crank lever is mounted on a horizontal pin forming a part of a lug 157 rising from the top wall 46, and a coiled spring 158 surrounds said pin and engages said horizontal arm 155$^a$ in such a manner as to hold it in its downward position. Said bell crank has an upright arm 155$^b$ which extends into the path of the long arm 159$^a$ of a bell crank lever 159, which is pivoted to swing in a horizontal plane about a vertical axis arising from the top wall in the vicinity of the locking end of the bolt lock 150. The said bell crank 159 includes a short arm 159$^b$ which normally engages against the bottom end of a rocking lever 160 (see Figs. 5, 13 and 14) which is pivoted near its middle to a member 161 connecting the top end of the upright extension 141 with an adjacent part of the secondary frame 47. The top end of the rocking lever 160 is connected by a link 162 (see Fig. 13) to the universal bar 77, before mentioned.

The long arm 159$^a$ of said bell crank lever is extended towards the tone arm bracket and is arranged in a plane above and is adapted to be engaged by a pin 160$^a$ on an endwise, movable horizontal rod 160$^x$, which is actuated in a manner to appear later. A second bell crank lever 161 is also pivoted about a vertical axis on the top wall 46, to swing in a horizontal plane, said bell crank having a long arm 161$^a$ which engages against the head 150$^a$ of the locking bolt 150, and a short arm 161$^b$ arranged in a plane below the endwise movable rod 160$^x$ and which is adapted to be engaged by a depending pin 160$^b$ on said rod. Thus when the rod 160$^x$ is moved endwise in one direction, it will cause the bell crank 159 to actuate the member 155 to move the latch 153 out of locking engagement with the sliding bolt 150, so that the bolt will lock the magazine in position, in order that a record may be removed therefrom, and when said rod is moved in the other direction, it will actuate the bell crank 161 to withdraw the bolt 150, after the record has been replaced in said magazine, so that said magazine can return to its normal position under the action of the counter balance 68, when the latch 153 will again hold said locking bolt in its retracted position.

Means are provided for removing a record 57 from the magazine, after it has been moved to bring the desired record into the horizontal plane of the turn table 80, and to transfer or move said record into proper playing position upon said turn table, and such means are as follows:—170 indicates a horizontally swinging arm that is pivoted upon a vertical pin 171 fixed in the platform 43 before mentioned, in a plane intermediate the vertical plane of the axis of the records in the magazine, and the axis of the turn table 80. Said arm is adapted to be swung from its normal position shown in Fig. 2, to the full line position shown in Fig. 4, where it picks up a record 57 from the magazine and transfers or swings the same into axial alignment with the turn table, as shown in dotted lines in Fig. 4. This arm, of course, is of a length slightly greater than the distance between the axis of the turn table and the pin 171. It is guided in its swinging movement by an arcuate plate 172 fixed on the top of the platform 43. The arm 170 has a longitudinal groove 170$^a$ in its top surface, which terminates at its inner end in the plane of the edge of the plate 172, and which opens at its outer end in a notch 173 which in itself opens through the left hand side of the arm 170 (see Fig. 2). In said groove slides a key 174 which is adapted to open and close the end of the notch 173. Said key is normally in a position leaving the notch 173 open so that when the arm 170 swings towards the left to pick up a record, the notch will embrace the top end 61$^a$ of the record pin 61 before described, after which the key 174 moves endwise to close the notch 173, so that when the arm 170 again swings towards the right, it will carry a record with it.

On the arm 170 near the plate 172, is carried a trip device indicated as a whole in Figs. 4 and 33, by the numeral 175, which engages with an associated device on the platform 43 at the left hand end of the plate 172, which is indicated as a whole in said Figs. 4 and 33, by the numeral 176, which devices combine to actuate the key 174. The device 176 includes an upright standard 177 mounted on the platform 43 and to the top end of said standard is pivoted a latch 178 (see Fig. 36). A screw and slot construction 179 limits the swinging movement of said latch, which is held in its normal position by a spring 180 that is fixed at one end to said latch and at its other end to a lateral extension of said standard 177. Said latch has two actuating ends or points 178$^a$ and 178$^b$ respectively.

The device 175 on the lever 170 includes an upright standard 181 (see Fig. 34) fixed to said lever and journaled at one end in said standard 181, and at its other end in an upright lug 182 of said lever, is a step by step, rotative shaft 183. Near the standard 181 said shaft is made square in cross section as at 184, and near the lug 182 said shaft has a star or toothed wheel 185 fixed to it. Pivoted to the upright standard 181 is a member 186 which has an inverted V-shaped notch 186$^a$. This member lies over the squared part 184 of the shaft 183 and a spring 187 holds it in engagement with said squared part. This member acts as a lock to hold the shaft in the position it is left in after having been rotated one eighth of a revolution by the star wheel 185. The standard 181 includes two spaced bearing ears 188 and a lateral extension 189, and in said ears is supported a shaft 190 upon which is pivotally mounted a swinging block 191, arranged in the vertical plane of the squared part of the shaft 183. The shaft 190 passes through one corner of the block 191, and the bottom end of said block is reduced in width and extends into a recess 174$^a$ formed (see Figs. 34 and 35) in the enlarged inner end 174$^b$ of the key 174. This enlarged end provides a shoulder 174$^c$ between which and a fixed part of the lever, an expansion coil spring 192 is located. This spring holds the key 174 in its retracted position so that the block 191 will be in the position shown in Fig. 34, wherein a corner of the block which acts in the manner of a bell crank engages the bottom squared surface of the shaft 183.

On the extension 189 of the standard 175 is a vertically depressible spring pressed block 193 which normally stands in the path of the point 178$^b$ of the latch 178, so that as the arm 170 swings towards the left, the block 193 will engage the point 178$^b$ and swing the latch into the position shown in Fig. 36, expanding or stretching the spring 180. As the arm 170 approaches its limit of movement towards a record in the magazine, the block 193 is depressed by reason of its engagement with a lug 177$^a$ on the standard 177, so as to release the latch 178, whereupon its point 178$^a$ will strike one of the teeth on the star wheel and impart an eighth of a revolution thereto. The points of said latch will then pass by said star wheel, so that the arm 170 may again move in the other direction. When the star wheel is thus turned, it will, through one corner of its squared portion 184, swing said block 191 to impart an endwise outer movement to the key, which will close the open end of the slot 173 and lock the record pin in its place, so that the arm 170 may move the record towards the turn table 80.

Connected to the arm 170 about midway between the pivot 171 and arcuate plate 172, is one end of a link 195 which carries an upright stud 195$^a$, the other end of said link being connected to a relatively short lever 196 which is fixed to an upright shaft 197 journaled in suitable bearings on the platforms 43, 44. On the shaft 197, a short distance below the platform 43, is fixed a bevel gear 197$^a$ which meshes with a bevel pinion 198$^a$ on the end of a horizontal shaft 198, journaled at one end in a bracket 198$^b$ depending from the platform 43, and at its other end in a horizontal bar 199, which is fixed at its ends to front and rear standards 200, 200$^a$ (see Figs. 16, 17, 18) respectively, between the platforms 43 and 44. A spur gear 201 is fixed to that end of the shaft journaled in the bar 199, and this gear is driven in such a manner as to impart almost one complete revolution to the shaft 197 in one direction and then in a reverse direction to the original position. This movement of the shaft 197 will cause the short lever 196 to swing towards the left from its normal position shown in Fig. 2, through the full line position shown in Fig. 4, where the arm 170 picks up a record and into the dotted line position shown in said Figure 4, where the arm 170 holds the record in playing position upon the turn table.

Loosely mounted on the top end of the shaft 197 in a plane above the lever 196, is a long arm 205 which has a lug 205$^a$ on its bottom side (shown in dotted lines in Fig.

2) and which is connected at its outer end by a pin and slot connection to the rod 125, which as before described, is in turn connected to the frame 97. Also loosely mounted on the top end of said shaft 197 is a double arm lever, indicated as a whole in Fig. 4 by the numeral 206. One arm 206ª of said lever has connected to it, the endwise movable rod 160 before described, which actuates the parts associated with the magazine stop locking bolt 150, and to the other arm 206ᵇ of said lever is connected a second endwise movable rod 207 (see Fig. 5) the purpose of which will appear later. The arm 206ª includes a depending flange 206ᶜ which in the swing of the arm 196 is adapted to be engaged by the pin 195ª on the link 195, so as to actuate the lever 206 as a whole. The levers 205, 206 are held against vertical displacement by bridge pieces 208 fixed at one end to the end of the arcuate plate 172, and at its other end to a post arising from the platform 43.

Along one edge of the platform near the top end of the shaft 197, is a sliding bolt 210 which has bearing in blocks 211 fixed to the top surface of the platform 43. This bolt has a shoulder 210ª (see Fig. 4) which is adapted to be engaged by the lever 196 when the same is actuated, to impart an endwise movement to said sliding bolt against the action of a flat leaf spring 212, which engages the inner end of said bolt, and acts to return it to its normal position. When the end of the lever 196 has engaged said shoulder, the lever 170 is in the position shown in dotted lines, wherein the record is in playing position upon the turn table and to yieldingly lock the parts in this position, I provide a leaf spring 211ª which engages the end of the lever 196 as shown in Fig. 4, when said lever engages the shoulder 210ª.

The other end of the sliding bolt normally extends into a position back of the top end 213ª of a hammer 213, which is pivoted at 214 (see Fig. 16) to a part of a standard 215 which supports the associated end of the platform 43 upon the platform 44. The bottom end of the hammer 213 has a weighted head 213ᵇ in which is provided a recess 213ᶜ, shown in dotted lines in Fig. 16. A leaf spring 216 which is fixed to the edge of the platform 43, imparts a sudden swing to the hammer 213 when the locking bolt 210 has been withdrawn from locking engagement with the top end 213ª of said hammer. When unlocked by the bolt 210, the hammer strikes the associated end of a clutch shifting rod 217, and moves said rod endwise, the weighted head 213ᵇ adding momentum to the action of the spring 216. This rod has sliding bearing at one end in a bracket 218 depending from the platform 43 and at its other end in a horizontal bar 219 (see Figs. 17 and 22) which is fixed to the front and rear standards 200, 200ª respectively, in a plane below the bar 199 before mentioned.

When the hammer 213 has thus operated, it is returned to its normal position wherein it is under the tension of the leaf spring 216, by a horizontal rod 220, (see Fig. 16) arranged in a plane below the rod 217 above mentioned. The rod 220 has sliding bearing in the bracket 218 and at one end extends into the recess 213ᶜ in the hammer block 213ᵇ. The other end of this rod is connected to the bottom end of a vertically swinging lever 221 which is pivoted between its ends to a bracket 222 depending from the platform 43. The top end of this lever extends through a longitudinal slot 43ˣ in the platform 43 (see Fig. 4) into the path of the record transfer lever 170, so as to be engaged by the edge of said lever. To permit of the proper movement of the lever 221, a notch 170ᵇ is provided in the lever 170. Thus, when the lever 170 swings to the left from the position shown in Fig. 2, into the full line position shown in Fig. 4, it will actuate the lever 221 to impart an endwise movement to the rod 220 towards the right, which will push outwardly on the head 213ᵇ of the hammer, to swing the top end 213ª inwardly, after which the bolt 210 will move so that its outer end will engage behind the said top end 213ª and lock the hammer under tension, ready for its next operation.

Power for driving the various parts thus far described, is provided for by an inverted electric motor 225 which depends from the platform 44 by a bracket 225ª. The armature shaft of the motor carries a worm 226 which meshes with a worm gear 227 on a horizontal shaft 228, journaled beneath the platform 44 in suitable brackets fixed to the main frame of the machine as a whole. On the right hand end of said shaft is fixed a pulley 229 which, through a belt 230, drives the pulley 82 on the shaft 18, that actuates the turn table. On the left hand end of the shaft 228 is fixed a second pulley 231 which, through a twisted belt 232, drives a larger pulley 233 (see Figs. 1 and 4) fixed to a horizontal shaft 234 which is arranged in a plane above that of the platform 43, and is journaled at its ends in two of the upright members forming the secondary frame 47, in which the magazine 50 has vertical movement.

Loosely mounted on the shaft 234 is a spur gear 235 (see Figs. 4 and 22) which normally meshes with the rack bar 69 of the magazine. This gear carries a clutch face 235ª which is adapted to be engaged by a clutch member 236 slidable on but rotative with the shaft 234. Thus, when the shaft 234 is driven by the motor 225, and the clutch member 236 is in engagement with the clutch face on the gear 235, a downward movement will be imparted to the magazine 50, to bring the selected record into a position to be transferred from the magazine to the turn table by the lever 170. After the record has been played and returned to the magazine, the clutch 236 is disengaged from the gear 235, when the counter balance 68 will return the magazine to its normal elevated position. To prevent the too rapid movement of the magazine in either its downward or upward movement, I provide a governor mechanism which is located in a box or casing 237, mounted above an opening 238 in the platform 43. The governor mechanism in this casing includes a gear 237$^a$ which meshes with the gear 235.

The clutch 236 also includes an upright shifting plate 239 which embraces the sleeve of the clutch and which has a horizontal sliding bearing on a part 240 of the secondary frame 47. A spring 241 fixed to the plate 239 and part 240, normally tends to draw the clutch 236 into engagement with the gear 235 so that as soon as the shaft 234 starts rotating, an engagement between the clutch 236 and gear 235 is insured, to impart a downward movement to the magazine. When the selected record reaches the plane of the turn table, the magazine is locked in this position by the bolt 150 before mentioned, after which the clutch 236 is disengaged from the gear 235 by the action of a horizontally swinging lever 243. As shown in Figs. 4 and 23, this lever is pivoted on the vertical extension 245$^a$ of a horizontal bar 245, which in itself is fixed at one end to the top end of a post 246 arising from the platform and at its other end to a depending flange 247 on the platform 43. The inner end of this lever is connected to the bottom end of the clutch shifting plate 239. The outer end of said lever extends beneath the governor casing 237 into the vicinity of the margin of the platform 43, where it is engaged by a spring pressed latch 248 which is pivoted at one end to swing in a horizontal plane. Said outer end of the lever 243 is also connected to the end of the rod 207 before mentioned, and a spring 249 connects said end of the lever 243 with a fixed part of the platform 43. When the clutch 236 has been disengaged by the action of the lever 243, it is held out of engagement by a gravity latch 250 pivoted on the part 240 before mentioned, of the secondary frame 47, as shown in dotted lines in Fig. 22. This latch is held out of its locking engagement with the arm 239 by reason of its being engaged by a projection 251$^a$ on an upright bar 251, which has a limited vertical movement in a top guide 252 (see Figs. 1 and 9) fixed on the top of the secondary frame, and a bottom guide 252$^a$ (see Fig. 17) forming a part of a third horizontal member 253, which is attached near its ends to the standards 200, 200$^a$ in a plane below the bar 219.

This rod has a finger 251$^b$ (see Fig. 8) which is normally held in engagement with a fixed part of the top of the magazine by the action of a spring 254 (see Fig. 1) fixed to said rod and an ear on the rail 48. Thus when the magazine moves downwardly, the spring 254 will cause the rod 251 to move with it for a limited distance, until arrested by the engagement of a pin at the top end of the rod, with the bearing guide 252. When the magazine moves upwardly it will engage the finger 251$^b$ and return the rod to its normal position. Near the bottom end of said rod, below the extension 251$^a$, is a cam or enlargement 251$^c$ (see Figs. 21 and 22), the purpose of which will appear later.

260 indicates a third pulley on the shaft 228 near the pulley 231. This pulley 260, by means of a twisted belt 261, drives a pulley 262 fixed to a horizontal shaft 263, which has bearing in the bar 219, the standard 246, and another standard 264, respectively, rising from the platform 44 near the standard 246. On that end of the shaft, outside of the standard 264, is fixed a spur gear 265 which meshes with a spur pinion (see Fig. 18) on a shaft 267 journaled at its ends in another standard 264$^a$ near the standard 264, and a bracket bearing 264$^b$ fixed to one of the uprights of the frame. This shaft also carries near the bracket 264$^b$, a fly wheel 268 and on the shaft 263, between the pulley 262 and standard 246, is fixed a sprocket wheel 269. On the opposite end of the shaft 263 near the bar 219 is loosely mounted a clutch faced pinion 270, which meshes with the gear 201 before mentioned. A clutch sleeve 271 is keyed to slide on and rotate with said shaft, and a clutch shifting plate 272, which rises from a slide 273, actuates said plate to move the same out of engagement with said pinion 270. The slide 273 is reduced in width at one end 273$^a$, which extends through a correspondingly shaped hole in the standard 246, and is there engaged by a leaf spring 274. The other end 273$^b$ of the slide 273 has sliding bearing in a hole provided therefor in the cross bar 219.

Engaging with the top end of the shifter plate 272 is a cam 275$^a$ on a lever 275 (see Fig. 18) which lever is pivoted at its outer end on a part 276 fixed to the standard 200 and at its inner end, said lever has guided bearing in spaced ears 277 fixed to the upright rail 48 before mentioned. The inner end of said lever is bent near the rail 48 to extend into the vertical plane of the cam 251$^c$ of the rod 251, so that as the rod moves upwardly, the cam 251$^c$ will engage the bent end of the lever and swing it towards the rail. This swinging movement of the lever, will, through the lever cam 275$^a$ and clutch plate 272, move the clutch 271 out of engagement with the gear 270. When the rod 251 moves downwardly so as to free the bent end of the lever 275, the spring 274 will cause the slide to move and bring the clutch into engagement with the gear 270.

The sprocket wheel 269 drives through a chain 280, a second sprocket wheel 281, on the end of the shaft 282, journaled in the horizontal bars 199 and 245 respectively. On the other end of said shaft is loosely mounted a spur pinion 283 (see Figs. 17 and 18) which in turn meshes with a pinion 284 on another shaft 285, which is also journaled at its ends in the bars 199 and 245. This pinion 284 also meshes with the gear 201. The gear 282 also has a clutch face which is adapted to be engaged by a clutch sleeve 286 keyed to slide on and rotate with the shaft 282. Associated with the clutch is a shifter plate 287 which is fixed to a slide 288 (see Figs. 23 and 24), the reduced inner end of the which slides in a hole provided therefor, in a hanger 289, depending from the bar 245. The other end of the slide bears in a recess in the bar 219 and said other end has a recess 288ª into which the end of the rod 217 extends. A spring 290 fixed to the top end of the clutch shifter plate 287 and the platform 43, normally tends to draw the clutch 286 into engagement with the gear 283, but this is prevented by reason of the engagement of a latch 291 (see Fig. 19). This latch is pivoted to the bar 219 and extends into the path of the slide and is normally held in this position by a spring 291ª.

292 indicates a similar latch (see Figs. 17-19 and 22) which is also pivoted on the bar 219, and extends into the path of the slide 272 associated with the clutch 271. The latch 292 is actuated to release the slide 272 by a longitudinally arranged rocking flat bar 293, which is pivoted at one end in the cross bar 253 before mentioned, and at its other end in the top end of a post 294 (see Figs. 16 and 25) at one end of the platform 44. A yielding latch 295 which in itself is connected to one end of a horizontally swinging arm 296, on the post 294, actuates the rock bar 293 to trip the latch 292.

The other end of the arm 296 is reduced in diameter and extends into a slot 297ª (see Fig. 25) of a vertically swinging lever 297 which is pivoted at its bottom end to the side of the post 294. The top end of the lever projects in the plane of the casing top wall 46, and is connected by a horizontal rod 298 with a stud 100ª on the member 100 of the frame 97. Thus, when the frame 97 moves into the position shown in dotted lines in Fig. 5, the lever 297 operates to move the latch 295 so that its notch embraces the edge of the bar 293 so that when the frame 97 again moves into its original position, it will not rock the bar 293 to actuate the latch 292 and thus allow the clutch 271 to engage the gear 270.

300 indicates as a whole, a primary switch for the motor 225. This switch is enclosed in a casing 301 supported by the part 276 to which the lever 275 is pivoted. In the casing is a fixed contact 302 and a movable contact 303, which movable contact is mounted on a shifting block 304, the top end of which projects through the top wall of the casing 301. An electromagnet 305, mounted on a suitable insulated support 306, carried by a corner post 307, which supports one corner of the platform 43, from the platform 44, is adapted, when energized, to actuate a pivoted arm 308 which will then strike the insulation block and cause the contact 303 to engage the fixed contact 302. Engagement of these contacts is broken by means of a lever 309 (see Figs. 16, 17 and 23) which is pivoted on the flange 247, so as to have a rocking movement, the bottom end of said lever being adapted to strike the block 304 from the opposite side and separate the contacts 303 and 302.

The top end of this lever 309 is loosely connected to the free end of the latch 248 which locks the lever 243. The latch 248 is actuated to release the lever 243 and operate the lever 309 by means of another lever 310, which is pivoted at its middle to an extension 307ª of the corner post 307. The top end of this lever has a loose connection with the latch 248 by means of a plate 248ª and the bottom end of said lever carries a cross bar 310ª which is adapted to be attracted by an electromagnet 311 mounted on a block 311ª fixed to the platform 44.

315 indicates an insulated casing which is fixed to the platform 44 and standard 200 respectively. This casing encloses the secondary switch 314 for the motor 225, which switch consists of a pair of spaced, fixed contact members 316, 317 (see Fig. 17), which are adapted to be bridged by a movable contact 318. The movable contact 318 is carried on the inner end of a horizontally movable insulation bar 319 which extends without the casing 315 to be connected by a link 320 to a vertically swinging lever 321 pivoted at its bottom end on the casing 315. The top end of said lever extends through the opening 238 in the platform 43, into engagement with a cam 207ª on the rod 207 before referred to. A coiled spring 322, which is fixed to the top end of said lever and the platform 43, tends to hold said lever in engagement with said cam and a leaf spring 323 fixed on the bar 199 (see Figs. 17 and 18), engages the side of said lever and guides it in its movement.

When the rod 207 is moved endwise to withdraw the cam 207ª from the lever 321, the spring 322 will actuate the same so that the contact 318 will bridge the gap between the contacts 316 and 317. In this movement of the lever 321, it will engage with the short end of a pawl 325 (see Figs. 19 and 20) pivoted at 326 in one corner of a latch plate 327, adapted to swing in a horizontal plane about a pivot on the top edge of the bar 219. A spring 328 is interposed between the long end of said pawl and a fixed part of the plate 327, a pin 329 limiting the movement of said long end of the pawl. The latch plate 327 engages the top end of the latch 291, to actuate the same to release the associated clutch. Thus, when the lever is moved to the left, as in Fig. 20, it will, through the pawl 325, rotate the plate 327 to trip the latch and upon the return movement of the lever 321, it will strike the opposite side of the short end of the pawl, which will swing about the pivot 326 to allow the lever to pass.

In Fig. 38 is illustrated the electric circuit incorporated in the automatic phonograph. 330, 331 indicate respectively, the main motor circuit wires which may, by a plug 332 be tapped into any electric light socket. The wire 330 is connected to the fixed contacts 317 and 302 of the secondary and primary switches of the motor. The other wire 331 is connected to the brushes of the motor and to the fixed contact 316 of the secondary switch and to the movable contact 303 of the primary switch. One of the coils of the magnet 305 is connected by a wire 333 with a wire 334 leading off from one side of a battery 335, said wire 334 being connected to one of the coils of the tripping magnet 130. A wire 336 leads off from the wire 333 and is connected by shorter wires 337, one to each of the contacts 75 on the arms 73. A wire 338 leads off from the other coil of the magnet 305, and is connected in series to one coil of each of the magnets 70, the coils of each magnet being connected by a wire 339. The other coil of each pair of magnets are each connected by a wire 340 with one of the contacts of an associated push button 341, there being of course a push button associated with each pair of magnets 70. These buttons are mounted in a control plate 342, which may be secured on the casing 45 or may be located in a room remote from that in which the machine is located. On this plate are cards 343, one for each button, each card bearing the name of a record 57, in the magazine, there being of course a record associated with each pair of magnets 70. Thus, the desired record to be played may be selected by pushing the associated button. The other contacts of the push buttons 341, are connected by wires 344 to a wire 345 leading to the other side of the battery.

A wire 346 leading off from the wire 345 is connected to one of the coils of the magnet 311, another wire 347 connecting the other coil of said magnet with the contact 76 on the record magazine. A wire 348 connects the other coil of the magnet 130 with the contact 93 on the mute needle arm 91, while a wire 349 connects the sound box contact 90 with the wire 345 leading off the battery 335. Wires 350 and 351 lead off from the mute needle contact 93 and sound box contact 90 to the contacts of an extra button 341$^a$ on the plate 342. The purpose of this button is to stop the machine during the playing of any record and it has a card 343$^a$ associated with it to distinguish it from the other buttons 341.

The operation of the improved automatic phonograph is as follows: Assume that all of the parts are in their normal positions, the magazine being in its elevated position, the lever 170 being in the position shown in Fig. 2, and both the sound box 89 and mute needle post 92 being held in a position above the turn table by the frame 97. Assume that it is desired to play the topmost record 57 in the magazine, which record is of the usual 10-inch diameter. The button 341 associated therewith, would be that button in the lower right hand corner of the button plate 342, in Fig. 38. When this button is actuated, it will close a circuit through the associated wires 340, 344, to the battery 335, and energize the associated magnet 70 which in this case would be the bottom magnet shown in Fig. 38, it being borne in mind that the topmost record is associated with the bottommost magnet, and that the second topmost record is associated with the second bottommost magnet, and so on. As the magnet 70 is energized, it will attract the associated arm 73, so that the contact 75 thereon is drawn into the plane of the path of the contact 76 on the magazine.

Simultaneously with the energizing of the magnet 70, the magnet 305 is energized to attract the arm 308 which strikes the insulation block 304 and moves the contact 303 into engagement with the fixed contact 302 thus closing the primary circuit to the motor 225 and starts the same into operation. This, of course, rotates the main shaft 228 and pulleys 229, 231 and 260, the pulley 229, through the belt 230, rotating the turn table 80 and the pulley 231 driving the pulley 233 on the shaft 234. The pulley 260 drives the pulley 262 on the shaft 263.

As the shaft 234 rotates, the clutch 236 thereon is drawn into engagement with the gear 235 which being in mesh with the rack bar 69 on the magazine, will impart a downward movement to the magazine, the speed of this movement being governed by the governor in the casing 237. During this time, the shafts 263 and 282 are being driven (the shaft 282 by the chain and sprockets 280, 269 and 281, respectively). and the fly wheel is also driven, through the gears 265 and 266, but the clutches on said shafts are still out of engagement with the associated gears. The contact 76 on the magazine in the downward movement thereof, engages that contact 75 which now extends into its path, and this brings the secondary magnet 311 into circuit with the battery 235, which being energized, attracts the block 310ª on the lever 310. This moves the top end of said lever outwardly, which in turn pulls the latch 248 from locking engagement with the pivoted lever 243. As the latch 248 is thus moved, it will actuate the lever 309, the bottom end of which strikes the block 304 from the other side and moves the contact 303 out of engagement with the contact 302, and thus cuts out the primary circuit of the motor.

Simultaneously with the cutting out of the primary motor switch 300, when the latch 248 is released, the spring 249 will impart an endwise movement to the rod 207 and a swinging movement to the pivoted lever 243, which will disengage the clutch 236 from the gear 235, when the latch 250 will lock the clutch in this disengaged position. This operation of the latch is permitted by reason of the downward movement of the rod 251 with the magazine, the extension 251ª on said rod being moved away from that position wherein it holds the latch 250 in its elevated position.

In the endwise movement of the rod 207, it draws the cam 207ª away from the lever 321, permitting the spring 322 to actuate said lever which moves the contact 318 into bridging position with the contacts 316, 317, closing the secondary switch 314 and circuit to the motor. This, of course, is done simultaneously with the opening of the primary switch, so that said motor does not stop its operation. During this movement of the rod 207, it will rock the double arm lever 206 and produce an endwise movement of the rod 160ˣ, connected to the arm 206ª of said lever. As the rod 160ˣ moves endwise, the pin 160ª near its opposite end, will engage the long arm 159ª of the bell crank 159, and perform two functions. First, the long arm 159ª will actuate the bell crank 155 to move the latch 153, so as to release the locking bolt 150, which is then moved by the spring 151 outwardly, so that its end will engage between the spaced bars 60 of the record holding frame and lock the same in position, wherein the record may be removed therefrom. Second, the short arm 159ᵇ of the bell crank lever will engage the bottom end of the upright rod 160, and rock the same about its pivot so that its top end is moved outwardly, and as said top end is connected by the link 162, to the universal bar 77, said bar will move outwardly and move that contact arm 73 which carries the contact 75, just engaged by the contact 76 on the magazine, out of said engagement, so that all of said arms 73 are again set in their normal positions.

In the downward movement of the magazine, the pin 143 on the bar 53 thereof, will move downwardly away from the vertically sliding block 142, in the guide 141, so that the spring 147 may now contract and pull the pivoted arm 138 into the position shown in dotted lines in Fig. 3. As the arm thus swings, it will also pull the block 136 on the guide 133 to the left, as shown in dotted lines, and by reason of the connection of the cable 146 to the arm 138, the block 142 is caused to move downwardly in the guide 141. Thus, when the tone arm and mute needle engage the record, they may follow the sound grooves therein.

As beforementioned, the upright rod 251 moves downwardly with the magazine under the action of the spring 254 until arrested by the stop pin at the top end thereof, which engages against the guide 252 on the top part of the secondary frame 47. As said rod moves downwardly, the cam 251ᶜ moves away from the bent end of the lever 243. However, the clutch 271 does not as yet engage with the gear 270, because the associated slide 272 is still locked by the latch 292.

As this occurs simultaneously with the release of the secondary switch lever 321, this lever will, when it operates as before mentioned, strike the pawl 325 and rotate the latch plate 327 to actuate the latch 291 to release the clutch slide 288, which permits the clutch 286 on the shaft 282 to engage with the gear 283 thereon, and thus drive the gear 201 on the shaft 198 through the pinion 284.

The shaft 198 by reason of the gears 198ª, and 197ª, will drive the shaft 198 (almost through one complete revolution) and the arm 196 will swing from the normal full line position in Fig. 2, into the dotted line position shown in Fig. 4. The link 195 which is connected at one end to the arm 196, and at its other end to the arm 170, will cause the arm 170 to swing towards the center of the record still in the magazine and about to be played. As the device 175 on the arm 170 reaches and engages with the coacting device 176 on the platform 43, the slot 173 in the arm 170 will embrace the loose pin 61 of the record to be played, when the slide 174 will close said slot so as to lock the pin in place. This position of the arm 170 is shown in full lines in Fig. 4, wherein the shaft 197 and the connections of the link 195 with the long and short levers 170 and 196 are all in a straight line. After the lever 196 swings through this straight line position, it will then swing the arm 170 in a reverse or right hand direction towards the turn table 80. At the limit of this movement of the arm 196 the record will have been positioned on the turn table 80 and the end of the lever will have engaged the shoulder 210ª in the bolt 210, which will now release the hammer 213, which will strike the end of the rod 217 and throw out the clutch 286, so that the gear 282 now stops driving the gear 201 on the shaft 198, the clutch slide 288 being again locked by the latch 291.

At about the time that the end of the lever 196 strikes the shoulder 210ª, the associated end of the link 195 will strike the lug 205ª (see Fig. 2) on the underside of the lever 205, and thereby impart an endwise movement to the rod 125 connected to the frame 97 before referred to. When the lever 196 approaches its limit of movement, it will slide past the leaf spring 211ª which, together with the shoulder 210ª, will yieldingly lock the arm 170 in a position wherein the record to be played is held centrally on the turn table.

When the endwise movement is imparted to the rod 125 by the lever 205 as before mentioned, it will move the frame 97 as a whole on the rails 101, 102, when the pin 122 on said frame will slide into the notch 123 in the latch 124, so as to lock said frame in this position. As this frame moves rearwardly, it will of course carry the block 106 with it, and as the stylus screw 89ᶜ rests in said slot, it will follow along the groove 106ª and let the stylus 89ᵇ gently down into the starting groove of the record, it being borne in mind that the record and turn table are both rotating. At the same time, as the stylus engages the record, the mute needle 96 will be gently let down into the sound groove at a point spaced near the center of the record, this letting down of the mute needle being brought about by the moving away of the plate 98 from the supporting engagement with the finger 95 associated with said mute needle.

Of course, as the stylus is now in engagement in the sound groove of the record, it will reproduce sounds therefrom in the usual manner and will then travel towards the mute needle which will have followed about the groove until it engages that annular shoulder marking the end of the sound groove in all disc records. Here the mute needle will wait for the sound box, the contacts 93 of the mute needle and 90 of the sound box, engaging after the stylus has reached the end of the active sound grooves of the record. When the frame 97 has been moved rearwardly, as mentioned, it will of course move the link 298 in that direction which will pull the lever 297 also in that direction. This will, through the member 296, (see Fig. 25) move the arm 295 forwardly so that the front shoulder defined by the notch therein will climb over the edge of the rocking flat bar 293, so as to engage the front face thereof.

When the contacts 90 and 93 have engaged, as before described, a battery circuit through the wires 348, 334 and 349, will be closed to energize the magnet 130, which will attract the bottom end of the lever 128. This causes the top end thereof to move the engaging end of the latch 124 to release the locking pin 122 of the frame 97 when the spring 120 will return said frame to its normal position. As the frame 97 thus moves forwardly, the rounded edge 98ª of the plate 98, will engage the sound box 89 and finger 95 of the mute needle, and elevate or lift them into a position above and out of engagement with the record on the turn table. In the forward movement of said frame 97, a like movement is imparted to the rod 298, and this in turn will rock the lever 277 forwardly, thus imparting a pull to the member 295 engaging the rocking bar 293. This rocks the bar 293, about a longitudinal axis after which the member 295 will yield to enter the position shown in Fig. 25. The other end of the bar 293 during this rocking movement will actuate or swing the latch 292 to the right as shown in Fig. 19 to release the clutch slide 273 so that the spring 274 on the post 246 will move the slide to cause engagement of said clutch with the gear 270, which meshing with the gear 201 will now drive the same in an opposite direction.

Thus, the shaft 197 will again be driven, but in a reverse direction, which will cause the arm 196 to begin its return movement wherein the arm 170 carrying with it the record just played, will begin its swing towards the associated record-holding frame in the magazine. As the pin 61 enters between the tines 62ª, 62ᵇ, of the bar 62, associated with the record frame, the tine 62ᵇ will yield to allow the pin to seat in the recess in the tine 62ª. When this occurs, the device 175 on the arm 170, will engage with the associated device 176 on the platform 43, and cause the slide 174 to be retracted to open the end of the slot 173 so that the lever 170 releases the record pin after it has been grasped by the tines as before mentioned. Thereafter the lever 170 will swing back into its normal position, as shown in Fig. 2.

As the lever 170 starts in its movement to remove the record from the turn table and replace the record in its frame, the top end of the lever 221 which projects through the slot 43ˣ in the platform into the path of the swinging lever 170, will be engaged by said lever and be moved towards the left, the bottom end moving towards the right. This will impart an endwise movement to the rod 220 which, by reason of its engagement in the recessed head 213ᵇ of the hammer 213, will reset the hammer under the tension of the spring 216, to move the top end of said hammer inwardly when the bolt 210, being released from the lever 196, will move under the action of the spring 212 into a locking position behind said top end to hold said hammer ready for the next operation.

In the approach of the arm 196 to its normal position shown in Fig. 2, the pin 195ª on the link 195 will engage against the depending flange 206ᶜ of the arm 206ᵃ of the double arm lever 206. This will impart a forward, endwise movement to the rod 160ˣ, when the pin 160ᵇ thereon will engage the arm 161ᵇ of the bell crank 161 and actuate it so that its other arm 161ᵃ will retract the bolt 150 out of locking position with the magazine, the latch 153 again acting to lock said bolt in its retracted position. When the magazine is released, as just described, the counter balance 68 will restore it to its elevated position. When the lever 206 is moved by the engagement of the pin 195ᵃ with the flange 206ᶜ, an endwise movement is imparted to the rod 207 through the arm 206ᵇ, whereupon the cam 207ᵃ will engage the lever 321 and open the secondary switch 314 to stop the motor. The rod 207 also being connected to the lever 243, will swing it so that it may be again engaged and locked by the latch 248. As the magazine approaches its normal upper position, the top end thereof will engage the finger 251ᵇ on the rod 251 and lift it upwardly, when the extension 251ᵃ will lift the latch 250 to release the clutch plate 239, and the cam 251ᶜ at the bottom end thereof will engage the bent end of the lever 275 to swing it so that the projection 275ᵃ will engage the clutch plate 272 and hold the clutch 271 out of engagement with the associated clutch.

It is apparent that the secondary switch for the motor is opened at about the same time that the lever 243 reaches the locking notch in the latch 248, and in order to insure the positive operation thereof, as well as the return of the lever 170 to its original starting position, I make use of the momentum of the fly wheel 268 after the motor has stopped to provide the necessary power to insure such movement.

After the frame 97 has moved forwardly to elevate the sound box and mute needle out of playing position, they are returned to their normal position (shown in Figs. 2 and 3) wherein they are again set with reference to the sound groove of the next record to be played, wherein the sound box will again be in position between the block 106ᵃ and lug 106ᶜ, by the following mechanism. As the magazine move upwardly, the pin 143 (see Fig. 13) will engage the bottom end of the sliding block 142 and move it upwardly in the guide 141. This will exert a pull on the cable 146 and that end which passes about the pulley 145 will move the lever 138 towards the right, into the full line position shown in Fig. 3. The free end of said lever 138 will push the block 136 to the right in Fig. 3, and the plate part 136ᶜ will engage the goose neck 88 and the arm part 136ᵈ will engage the mute needle post and impart a swinging movement to them, about the axis of the bracket 186, so that the said parts will again be returned to their original starting position. In the movement of the goose neck, as the sound box approaches its original position, said sound box will climb or slip over the lug 106ᶜ on the block 106, by reason of its incline shape, into the space between said lug and the block 106ᵃ. Thus all parts are again in their normal position, set ready to operate again on a 10-inch record, upon the touch of a button.

However, should the next record to be played, be a 12-inch record, the edge thereof will, when it is being swung towards the turn table 80, engage the straight end of the lever 115 (see Fig. 7) causing its bent end to strike the adjacent end lever 107, which will, through the slotted connection at the other end, move the block 106 as a whole, and the sound box with it, into a position ready to engage the starting groove of said 12-inch record, without moving the mute needle arm, which of course, remains in the same normal position for either a 10 or 12-inch record.

When the lever 107 has been thus actuated, the block 110 will have been moved to the left on the slide 111, through the link 109. The rest of the operation is thereafter the same as in the case of a 10-inch record. After the playing of a 12-inch record, and the lever 138 begins its movement to reset the sound box, and mute needle, the bottom edge of the plate 136ᶜ on the block 136, will engage the left hand end of the block 110 and push it outwardly. As said block 110 thus moves, it will, through the link 109, and lever 107, move the sound box receiving block 106 on the plate 98, back into that position ready to play a 10-inch record, the sound box and mute needle being reset as before described.

Should the record being played not suit the fancy of the operator, or for any other reason it is desired to remove the record before its full playing has been accomplished, it is only necessary to press the button 341ᵃ on the plate 342. This closes the circuit through the wires 350, 351, which will act the same as if the mute needle contact 93 and sound box contact 90 have engaged each other, energizing the magnet 130, after which the other parts operate as before described.

It is apparent from the foregoing description that my improved automatic phonograph has many advantages over machines now made for a similar purpose.

It is automatic in every sense of the word. All that is necessary to start the same to play any desired selected record, in the magazine, is to press the button associated with that particular record. Should it be desired to stop that particular record during any time in its rendition, it is only necessary to press a second button when that particular record is automatically removed from playing position and replaced in the magazine.

The machine automatically accommodates itself for the playing of records of different sizes without any manual operation on the part of the operator. It is fool-proof and positive in operation and the parts are so arranged and connected as to brace each other, reducing vibration and adding to the quality of the playing of the record.

New records may be easily substituted for those already in the magazine without the necessity of dismantling any part of the machine. This by reason of the use of the loose pin before described. As the battery employed in the circuit is only used momentarily for the purpose of contact, it will last a long time without renewing, the circuit therefore being open until required.

The machine may be actuated from a distance as well as in close proximity thereto, and actuation may be carried out by anyone, as no other operation is needed than the pushing of a button.

While in describing my invention, I have referred to certain details of mechanical construction and arrangement of parts, as well as to certain electric circuits, I do not limit myself thereto except as may be pointed out in the appended claims.

I claim as my invention:

1. In a phonograph, the combination of a turn table, a frame adapted to receive a disc record having a center hole, a pin associated with said frame and adapted to extend through the center hole of said disc record, and a device adapted to engage said pin and to transfer it and the associated record from the frame into playing position on said turn table.

2. In a phonograph, the combination of a turn table, a magazine adapted to receive a plurality of disc records each having a center hole, a plurality of pins associated with the magazine, each adapted to extend through said center hole of a disc record, a device adapted to engage any one of said pins and to move said pin and associated record into playing position on said turn table.

3. In a phonograph, the combination of a turn table, a magazine adapted to receive a plurality of disc records, a plurality of pins associated with the magazine, each adapted to extend through the center hole of a disc record, and a swinging arm adapted to engage any one of said pins and to move said pin and associated record into playing position on said turn table.

4. In a phonograph, the combination of a turn table, a vertically movable magazine comprising a plurality of disc record holding frames, a loose pin associated with each frame, adapted to extend through the center hole of the record therein, and a swinging arm adapted to grasp one of said pins and to transfer it and the associated record into playing position on the turn table with the pin in alignment with the axis of the turn table.

5. In a phonograph, the combination of a turn table, a vertically movable magazine comprising a plurality of disc record holding frames, a loose pin associated with each frame, adapted to extend through the center hole of the record therein, means associated with each frame to releasably lock the associated pin, and a swinging arm adapted to grasp said pin and to remove said pin and associated record from said frame and to transfer the same into playing position on the turn table with the pin in alignment with the axis of the turn table.

6. In a phonograph, a pinless turn table, a magazine adapted to hold a plurality of disc records each having a center hole, a plurality of loose pins in said magazine, one adapted to extend through the center hole of each record, and means engaging any one of said pins and for transferring said pin and associated record into playing position on said turn table, said means holding said pin in alignment with the axis of said turn table during the playing of said record.

7. In a phonograph, the combination of a turn table, a vertically movable magazine comprising a plurality of disc record holding frames, a loose pin associated with each frame, each adapted to extend through the center hole of the record therein, means associated with each frame to releasably lock the associated pin, and a pivoted arm adapted to grasp said pin and to transfer it and the associated record into playing position on the turn table, said releasable locking means being adjustable on said frame, so that the position of the pin therein may be determined with reference to the axis of the turn table.

8. In a phonograph, the combination of a turn table, a vertically movable magazine having a plurality of disc record holding frames, a loose pin associated with each frame, each adapted to extend through the center hole of an associated disc record, a horizontally swinging arm adapted to transfer said pin and associated record from the frame to the turn table and back to said frame, after it has been played, said arm having a notch at one end adapted to embrace said pin, and means closing said notch to lock said pin therein during the transferring movement of said arm.

9. In a phonograph, the combination of a turn table, a vertically movable magazine having a plurality of disc record holding frames, a loose pin associated with each frame, adapted to extend through the center hole of an associated disc record, a horizontally swinging arm adapted to transfer said pin and associated record from the frame to the turn table and back to said frame after it has been played, said arm having a notch at one end adapted to embrace said pin, and automatic means for closing and opening said notch to lock and unlock said pin in said notch, said means closing said notch during the transfer movement of said arm from the frame to the turn table, and acting to open said notch when said arm has swung back into said frame.

10. In a phonograph, the combination of a turn table, a vertically movable magazine having a plurality of disc record holding frames, a loose pin associated with each frame, each pin adapted to extend through the center hole of an associated disc record, a horizontally swinging arm adapted to transfer said pin and associated record from the frame to the turn table and back to said frame after it has been played, said arm having a notch at one end adapted to embrace said pin, an endwise movable bar carried by said arm to open and close said notch, and means acting to shift said bar to open and close said notch on each alternate movement of said arm, towards said frame.

11. In a phonograph, the combination of a turn table, a vertically movable magazine having a plurality of disc record holding frames, a loose pin associated with each frame, each pin adapted to extend through the center hole of an associated disc record, a horizontally swinging arm adapted to transfer said pin and associated record from the frame to the turn table and back to said frame after it has been played, said arm having a notch at one end adapted to embrace said pin, an endwise movable bar slidable in said arm to open and close said notch, and actuating means carried partly on said bar near its inner end and partly on the phonograph frame, to impart an endwise opening and closing movement to said bar.

12. In a phonograph, the combination of a turn table, a record holding frame, a loose pin removably secured to said frame, said pin including a shank adapted to extend through the center hole of a record and a flange to engage the bottom surface of said record, and means for engaging the shank of said pin above the record to transfer said pin and the record into playing position on said turn table, with the pin in alignment with the axis of the turn table, said pin providing an axis for said record when the said record is rotated by said turn table.

13. In a phonograph, a record holding means for a disc record having a center hole therethrough, said means comprising a pin having a cylindrical shank and a radial flange at the bottom end thereof, said shank being adapted to extend through the center hole of the record and to project beyond the playing surface thereof, with the radial flange in engagement with that part of the other surface of the record adjacent said center hole.

14. In a phonograph, the combination with a turn table, a disc record holding device, means for transferring a record from said holding device into playing position on said turn table, a tone arm including a stylus holding sound box, pivoted to swing in a horizontal plane as the stylus follows the record sound grooves, a horizontally movable frame overhanging said turn table and supporting said sound box, in a non-playing position above the record, means for moving said frame away from the sound box to permit the stylus to engage the starting groove of the record, and means carried by said frame and operable during the movement thereof, to guide the stylus and permit the same to gently enter the starting groove of said record.

15. In a phonograph, the combination of a turn table, a disc record holding device, means for transferring a record from said holding device into playing position on said turn table, a tone arm including a stylus holding sound box pivoted to swing in a horizontal plane as the stylus follows the record sound grooves, a horizontally movable frame overhanging said turn table and supporting said sound box in a non-playing position above the record, means for moving said frame away from the sound box to permit the stylus to engage the starting groove of the record, means for locking said frame after it has been thus moved, means acting to release said frame after the last active sound groove has been reached by said stylus, and means acting to move said frame back into its normal position to again elevate the sound box and lift the stylus out of engagement with said last active sound groove.

16. In a phonograph, the combination with a turn table, a disc record holding device, means for transferring a record from said holding device into playing position on said turn table, a tone arm pivoted to swing in a horizontal plane above said turn table, a sound box and stylus carried by said arm, a spring controlled horizontally movable frame normally arranged above said turn table and supporting said sound box in a non-playing position above the starting groove of the record, means for moving said frame out of supporting engagement from the sound box, means for locking said frame after it has been thus moved and means automatically releasing said locking means when the stylus reaches the last active sound groove in said record, to permit said frame to return to its normal position to elevate the sound box and lift the stylus out of engagement with the record.

17. In a phonograph, the combination with a turn table, a disc record holding device, means for transferring a record from said holding device into playing position on said turn table, a tone arm pivoted to swing in a horizontal plane above said turn table, a sound box and stylus carried by said arm, a spring controlled, horizontally movable frame normally arranged above said turn table, and supporting said sound box in a non-playing position above the starting groove of the record, means for moving said frame out of supporting engagement with the sound box, means for locking said frame after it has been thus moved, means automatically releasing said locking means when the stylus reaches the last active sound groove in said record, to permit said frame to return to its normal position to elevate the sound box and lift the stylus out of engagement with the record, and means for moving said sound box on said frame, back into starting position.

18. In a phonograph, the combination with a turn table, a disc record holding device, means for transferring a record from said holding device into playing position on said turn table, a tone arm including a stylus holding sound box pivoted to swing in a horizontal plane as the stylus follows the record sound grooves, a movable frame overhanging said turn table and supporting said sound box in a non-playing position above the record, means for moving said frame away from the sound box, to permit the stylus to engage the starting groove of the record, means for locking said frame after it has been thus moved, electro-magnetic means operable for releasing said locking means after the last active sound groove has been reached by said stylus, and means acting to move said frame back into its normal position to again elevate the sound box and lift the stylus out of engagement with said last active sound groove.

19. In a phonograph, the combination with a turn table, a disc record holding device, means for transferring a record from said holding device into playing position on said turn table, a tone arm including a stylus holding sound box pivoted to swing in a horizontal plane as the stylus follows the sound grooves, a contact carried by said sound box, a movable frame overhanging said turn table and supporting said sound box in a non-playing position above the record, a second contact member spaced from the contact on the sound box, means for moving said frame away from the sound box to permit the stylus to engage the starting groove of the record, means for locking said frame in the last mentioned position, and electro-magnetic means energized when the sound box contact reaches the last active sound groove and engages the second mentioned contact, to release said locking means for said frame and permit it to return to its normal position.

20. In a phonograph, the combination with a turn table, a disc record holding device, means for transferring a record from said holding device into playing position on said turn table, a tone arm including a stylus holding sound box, pivoted to swing in a horizontal plane as the stylus follows the sound grooves, a contact carried by said sound box, a movable frame overhanging said turn table and supporting said sound box in a non-playing position above the record, an arm pivoted coincident with the tone arm, a contact carried by said second arm and adapted to be engaged by the contact on the sound box when the stylus reaches the last active sound groove, means for moving said frame away from the sound box to permit the stylus to engage the starting groove of the record, means for locking said frame in this last mentioned position, and electro-magnetic means actuated upon engagement of the said contacts to release said frame locking means and to permit it to return to its normal position.

21. In a phonograph, the combination with a turn table, a disc record holding device, means for transferring a record from said holding device into playing position on said turn table, a tone arm including a stylus holding sound box, pivoted to swing in a horizontal plane as the stylus follows the sound grooves, a contact carried by said sound box, a movable frame overhanging said turn table and supporting said sound box in non-playing position above the record, an arm pivoted coincident with the tone arm and normally supported by said frame, a mute needle and a contact carried by the free end of said arm, said contact being engaged by the sound box contact when said stylus reaches the last active sound groove in said record, means for moving said frame away from the sound box and said arm to permit the stylus and mute needle to engage with the starting groove and an active groove of the record, said mute needle following said sound groove until it enters the last groove thereon, wherein it waits for the contact on the sound box, means for locking said frame in this last mentioned position, and electro-magnetic means energized upon engagement of the contacts to release said frame to return it to its normal position and to elevate both stylus and mute needle above the record.

22. In a phonograph, the combination of a turn table, a disc record holding device, means for transferring a record from said holding device into playing position on said turn table, a tone arm pivoted to swing in a horizontal plane, a sound box connected to said tone arm, a movable frame overhanging the turn table, a block carried by said frame and adapted to receive the sound box, said block including an extension upon which a part of the sound box engages, and means for moving said frame away from the sound box to permit the stylus carried thereby to engage the starting groove of the record, said block extension guiding that part of the sound box which engages upon it, during the movement of the frame, to direct the stylus and permit said stylus to gently enter the starting groove of the record.

23. In a phonograph, the combination of a turn table, a disc record holding device, means for transferring a record from said holding device into playing position on said turn table, a tone arm pivoted to swing in a horizontal plane, a sound box connected to said tone arm, a stationary frame overhanging said turn table, a second frame slidable on said stationary frame and supporting said sound box in a non-playing position above the record, means for moving said second frame on said stationary frame away from the sound box to permit the stylus carried thereby to engage the starting groove of the record, and an extension on said frame adapted to be engaged by a part of the sound box, said extension guiding said part of the sound box which engages upon it, during the movement of said second frame, to direct the stylus and permit it to gently enter the starting groove of the record.

24. In a phonograph, the combination of a turn table, a vertically movable magazine adapted to hold disc records of different diameters, means for transferring one of said records from the magazine into playing position on said turn table, a tone arm, a sound box and stylus on said tone arm, means for normally supporting said sound box in a non-playing position above said turn table, means on said supporting means adapted to guide the stylus into the starting groove of a record of one diameter, and means operable upon the transfer of a record of a different diameter from said magazine to the turn table, to set said stylus with reference to the starting groove of said record of different diameter.

25. In a phonograph, the combination of a turn table, a vertically movable magazine adapted to hold disc records of different diameters, means for transferring one of said records from the magazine into playing position on said turn table, a tone arm, a sound box and stylus on said tone arm, means for normally supporting said sound box in a non-playing position above the turn table, means on said supporting means adapted to guide the stylus into the starting groove of a record of one diameter, means operable upon the transfer of a record of a different diameter from the magazine to the turn table, to set said stylus with reference to the starting groove of said record of different diameter, and means operable after said record of the second diameter has been played to reset the stylus with reference to the starting groove of a record of the first mentioned diameter.

26. In a phonograph, the combination of a turn table, a vertically movable magazine adapted to hold disc records of different diameters, means for transferring one of said records from the magazine into playing position on said turn table, a tone arm, a sound box and stylus on said tone arm, means for normally supporting said sound box in a non-playing position above the turn table, means on said supporting means adapted to guide the stylus into the starting groove of a record of one diameter, and means actuated by a record of a different diameter during the transfer of said second record from the magazine, to the turn table, to set said stylus with reference to the starting groove of said record of said different diameter.

27. In a phonograph, the combination of turn table, a vertically movable magazine adapted to hold disc records of different diameters, means for transferring one of said records from the magazine into playing position on said turn table, a tone arm, a sound box and stylus on said tone arm, means for normally supporting said sound box in a non-playing position above said turn table, means on said supporting means adapted to guide the stylus into the starting groove of a record of one diameter, a movable frame overhanging said turn table and supporting said sound box and its stylus in a non-playing position above the turn table, a block movable on said movable frame engaged by said sound box and setting said stylus with reference to the starting groove of a record of one diameter, and means operable during the transfer of a record of different diameter from the magazine to the turn table, to shift said block on the movable frame, to set said stylus with reference to the starting groove of said record of different diameter.

28. In a phonograph, the combination of a turn table, a vertically movable magazine adapted to hold disc records of different diameters, means for transferring one of said records from the magazine into playing position on said turn table, a tone arm, a sound box and stylus on said tone arm, means for normally supporting said sound box in a non-playing position above said turn table, means on said supporting means adapted to guide the stylus into the starting groove of a record of one diameter, a movable frame overhanging said turn table and supporting said sound box and its stylus in a non-playing position above the turn table, a block movable on said movable frame engaged by said sound box and setting said stylus with reference to the starting grove of a record of one diameter, and a lever actuated by a record of different diameter, during the transfer of said record from the magazine to the turn table, to shift said block on said frame to set the stylus with reference to the starting groove of said record of different diameter.

29. In a phonograph, the combination of a turn table, a vertically movable magazine adapted to hold disc records of different diameters, means for transferring one of said records from the magazine into playing position on said turn table, a tone arm, a sound box and stylus on said tone arm, means normally supporting said sound box in a non-playing position above said turn table, means on said supporting means adapted to guide the stylus into the starting groove of a record of one diameter, a movable frame overhanging said turn table and supporting said sound box and its stylus in a non-playing position above the turn table, a block movable on said movable frame engaged by said sound box and setting said stylus with reference to the starting groove of a record of one diameter, a lever pivoted on said movable frame and operatively connected to said block, and a second lever pivoted on the phonograph frame and adapted to be engaged by the edge of a record of different diameter during the transfer of said record from the magazine to said turn table and to be actuated thereby, said second lever imparting movement to said lever on said frame to shift said block and to set the stylus with reference to the starting groove of said record of different diameter.

30. In a phonograph, the combination of a turn table, a vertically movable magazine adapted to hold a plurality of disc records, means for moving said magazine from its normal position into a second position to bring the desired selected record to be played into the plane of the turn table, means for locking the magazine in said second mentioned position, means for transferring said record from the magazine into playing position on the turn table, a tone arm, a sound box and stylus therefor, means for normally holding said sound box out of playing position with reference to the record on the turn table, means for setting said stylus with reference to the starting groove of the record, means for entering the stylus into said starting groove, means for removing said stylus from the record when the last groove of the record has been reached in the playing of the same, and means actuated by the magazine when it has returned to its normal position to shift said sound box back into starting position with reference to the next record to be played.

31. In a phonograph, the combination of a turn table, a vertically movable magazine adapted to hold a plurality of disc records, a driven shaft, means operatively connecting the magazine with said drive shaft, to move said magazine downwardly to bring the desired selected record to be played into the plane of said turn table, means operating when said selected record has reached the plane of the turn table, to disconnect the magazine from the drive shaft, means operable to engage a fixed part of the magazine to lock the same against movement, and means for transferring the said selected record from the magazine to the turn table.

32. In a phonograph, the combination of a turn table, a vertically movable magazine adapted to hold a plurality of disc records, a driven shaft, means operatively connecting the magazine with said drive shaft to move said magazine downwardly, to bring the desired selected record to be played into the plane of said turn table, means operating when said selected record has reached the plane of the turn table to disconnect the magazine from the drive shaft, electro-magnetic means operable to engage a fixed part of the magazine to lock the same against movement, and means for transferring said selected record from the magazine to the turn table.

33. In a phonograph, the combination of a turn table, a vertically movable magazine adapted to hold a plurality of disc records, a driven shaft operatively connected with said turn table, means operatively connecting the magazine with said drive shaft, to move said magazine downwardly to bring the selected record to be played into the plane of the turn table, means operating when said selected record has reached the plane of the turn table to disconnect the magazine from the drive shaft, means for locking said magazine after it has been disconnected from the drive shaft, and means for transferring said selected record from the magazine to the turn table while the same is rotating, said means holding the record in axial alignment with reference to the turn table.

34. In a phonograph, the combination of a turn table, a vertically movable magazine adapted to hold a plurality of disc records, a counterweight connected to the magazine, a driven shaft operatively connected to said turn table, means operatively connecting the magazine to said drive shaft to move said magazine downwardly to bring the selected record to be played into the plane of the turn table, means operating when said selected record has reached the plane of the turn table to disconnect the magazine from the drive shaft, means for locking said magazine after it has been disconnected from the drive shaft, means for transferring a record onto the turn table and back to the magazine after it has been played, means for unlocking the magazine so that it will return to its normal position under the influence of the counterweight, and means operatively connected to the magazine to control the speed of its movement in both its downward and upward movement.

35. In a phonograph, the combination of a turn table, a vertically movable magazine comprising a plurality of vertically spaced frames, each adapted to hold a disc record, a driven shaft, operatively connected to the turn table, means operatively connecting the magazine with the driven shaft to move the magazine downwardly to bring the frame holding the desired selected record to be played into the plane of the turn table, means operating when said frame has reached the plane of the turn table to disconnect the magazine from the driven shaft, means engaging that frame now in the plane of the turn table to lock said magazine against movement, and means for transferring said record from said frame to said turn table.

36. In a phonograph, the combination of a turn table, a vertically movable magazine comprising a plurality of vertically spaced frames each adapted to hold a disc record, a driven shaft operatively connected to the turn table, means operatively connecting the magazine with the driven shaft to move the magazine downwardly to bring the frame holding the desired selected record to be played into the plane of the turn table, means operating when said frame has reached the plane of the turn table to disconnect the magazine from the driven shaft, means engaging that frame now in the plane of the turn table to lock said magazine against movement, means for transferring said record from said frame to said turn table, and back to said frame after it has been played, means for releasing that means engaging the frame for locking the magazine after the record has been returned thereto, means for elevating the magazine to its normal position, and means acting during both the upward and downward movements of the magazine, to control the rapidity of movement thereof.

37. In a phonograph, the combination of a turn table, a vertically movable magazine adapted to hold a plurality of disc records, a driven shaft operatively connected to said turn table, means operatively connecting the magazine with the shaft to move the magazine downwardly, to bring the desired record to be played into the plane of the turn table, means for transferring said record to the turn table and back to the magazine after it has been played, a sound box associated with the turn table, to play the record, a counter-weight for returning said magazine to its normal position, and means operated by said magazine as it moves upwardly to reset the sound box with reference to the starting groove of the next record to be played.

38. In a phonograph, the combination of a turn table, a vertically movable magazine adapted to hold a plurality of disc records, a shaft, a motor for driving the same, means connecting the shaft with the turn table and with the magazine, a push button plate having buttons, one for each record in the magazine, each button being capable when actuated to start the motor, and electro-magnetic means to stop the motor when the record has been played.

39. In a phonograph, the combination of a turn table, a vertically movable magazine adapted to hold a plurality of disc records, a shaft, a motor for driving the same, means connecting the shaft with the turn table, and with the magazine, a push button plate having buttons, one for each record in the magazine, electro-magnetic means operable by any one of the push buttons to start the motor, electro-magnetic means to stop the playing of the record at any time after the start thereof, and means returning all the parts to their normal operative positions.

40. In a phonograph, the combination of a turn table, a vertically movable magazine comprising a plurality of vertically spaced, disc record holding frames, a contact carried by the magazine, movable contacts, one associated with each frame and adapted to be moved into the path of the contact on the magazine, a shaft, a motor for driving the same, a clutch mechanism for operatively connecting the magazine to the drive shaft, a switch for said motor, a push button, one for each movable contact, and adapted to actuate the associated movable contact, the motor switch and the said clutch means, and means connected with said clutch means and operable when the clutch is disengaged, to lock the magazine against movement in either direction.

In testimony that I claim the foregoing as my invention, I affix my signature in the presence of two witnesses, this 7th day of August, A. D., 1919.

HUGO F. SPENGLER.

Witnesses:
T. H. ALFREDS,
D. DARRENOUGUE.